Figure 1:
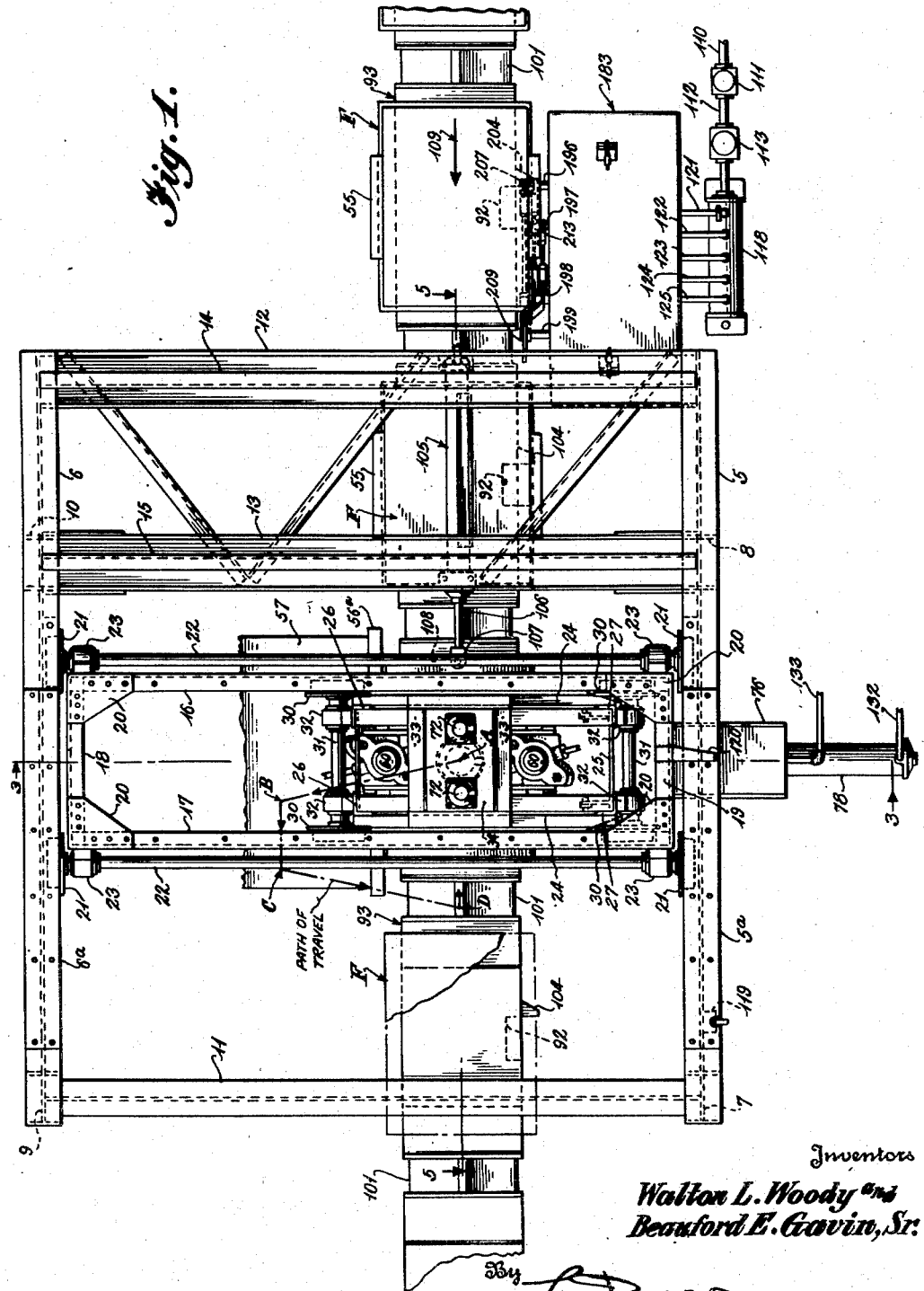

Oct. 10, 1950 W. L. WOODY ET AL 2,525,572
AUTOMATIC SHAKEOUT MACHINE FOR FLASK TYPE MOLDS
Filed March 23, 1948 19 Sheets-Sheet 1

Inventors
Walton L. Woody and
Beauford E. Gavin, Sr.

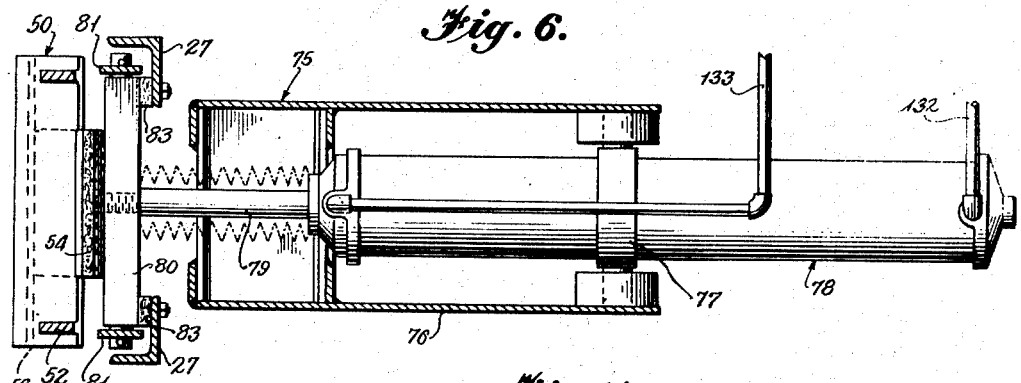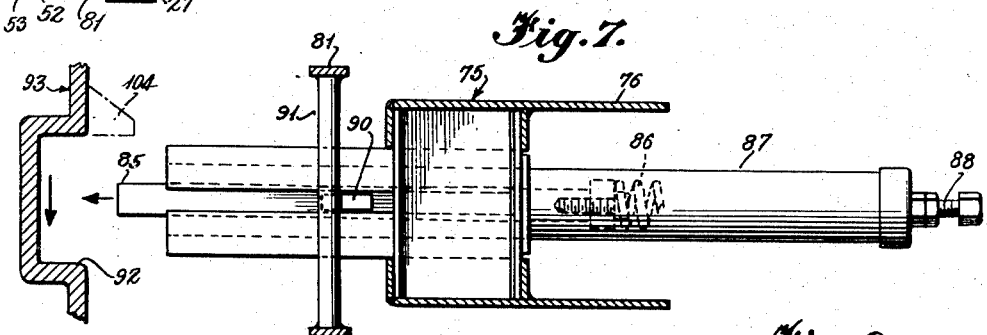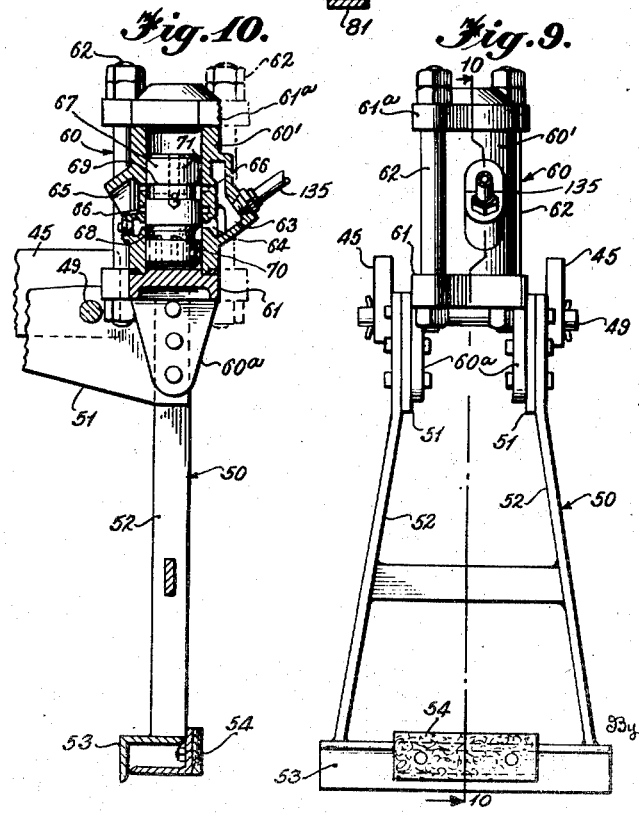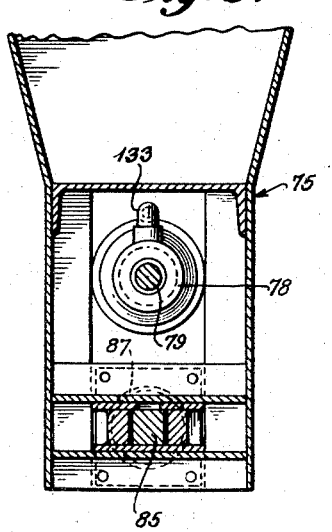
Fig. 6. Fig. 7. Fig. 8. Fig. 9. Fig. 10.
Inventors
Walton L. Woody and
Beauford E. Gavin, Sr.
Attorney

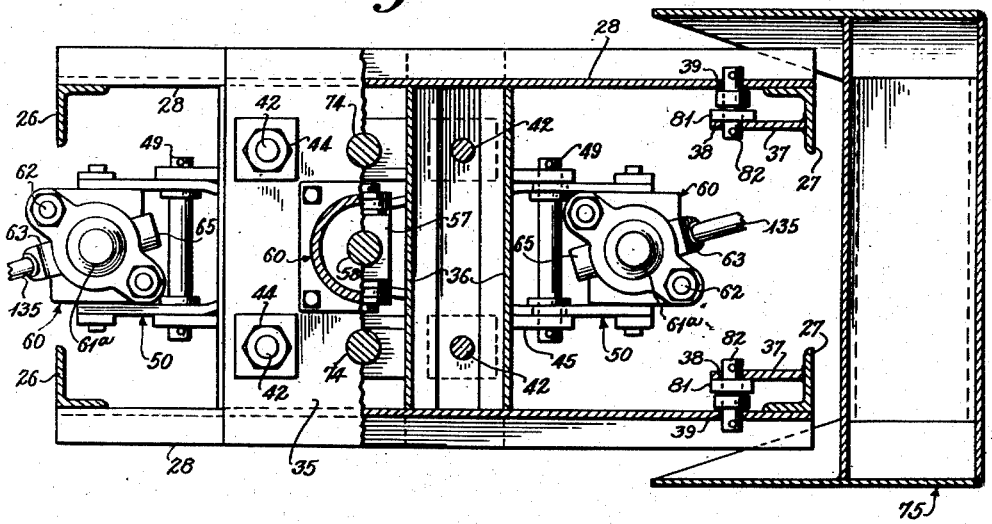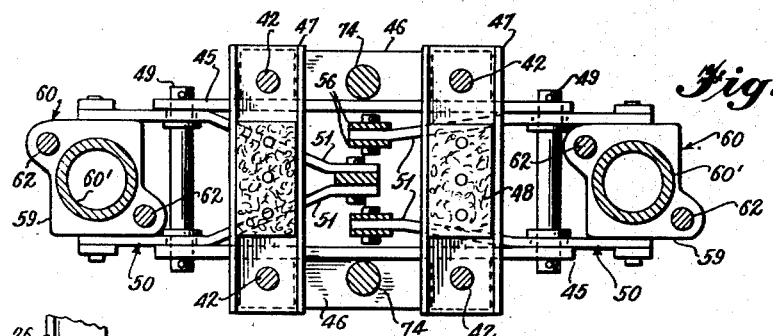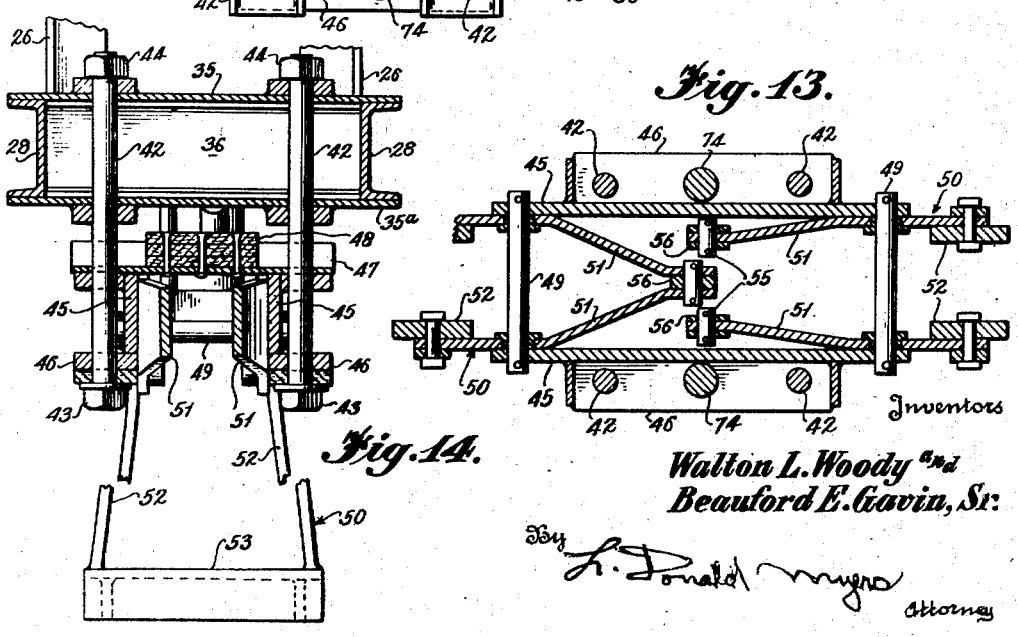

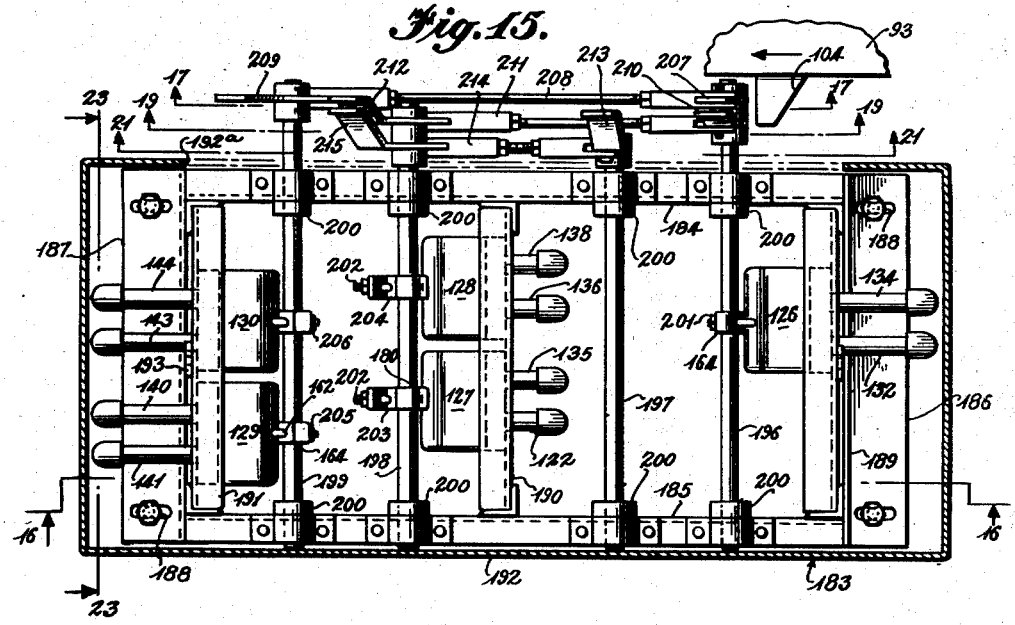

Oct. 10, 1950      W. L. WOODY ET AL      2,525,572
AUTOMATIC SHAKEOUT MACHINE FOR FLASK TYPE MOLDS
Filed March 23, 1948      19 Sheets-Sheet 9
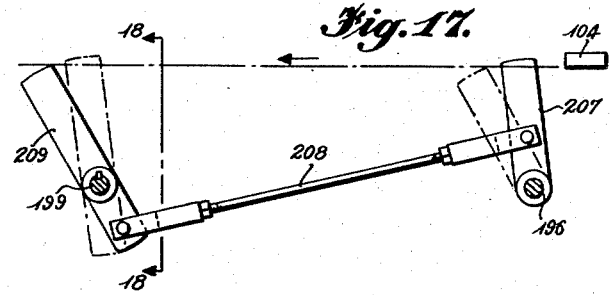
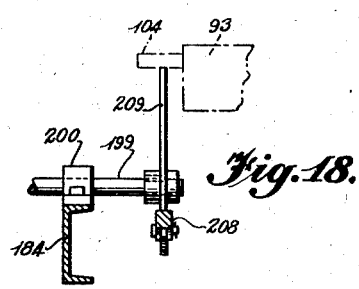
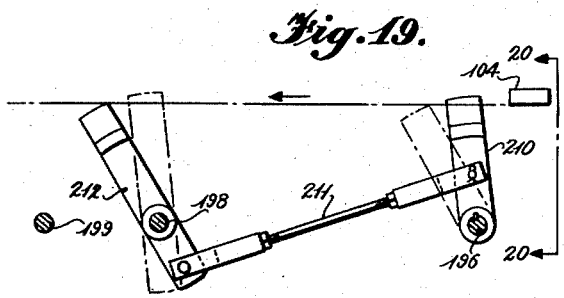
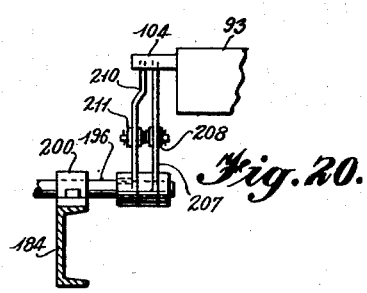
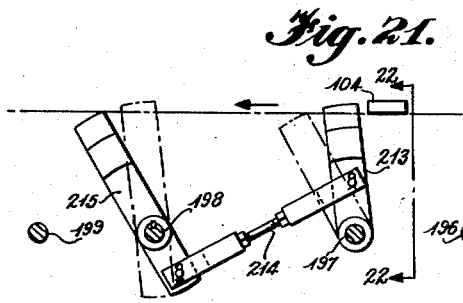
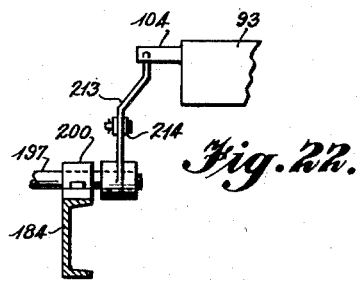
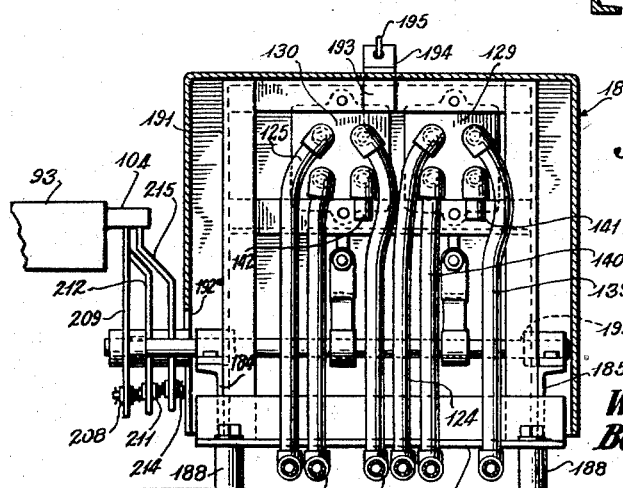
Inventors
Walton L. Woody and
Beauford E. Gavin, Sr.

Oct. 10, 1950      W. L. WOODY ET AL      2,525,572
AUTOMATIC SHAKEOUT MACHINE FOR FLASK TYPE MOLDS
Filed March 23, 1948      19 Sheets-Sheet 10
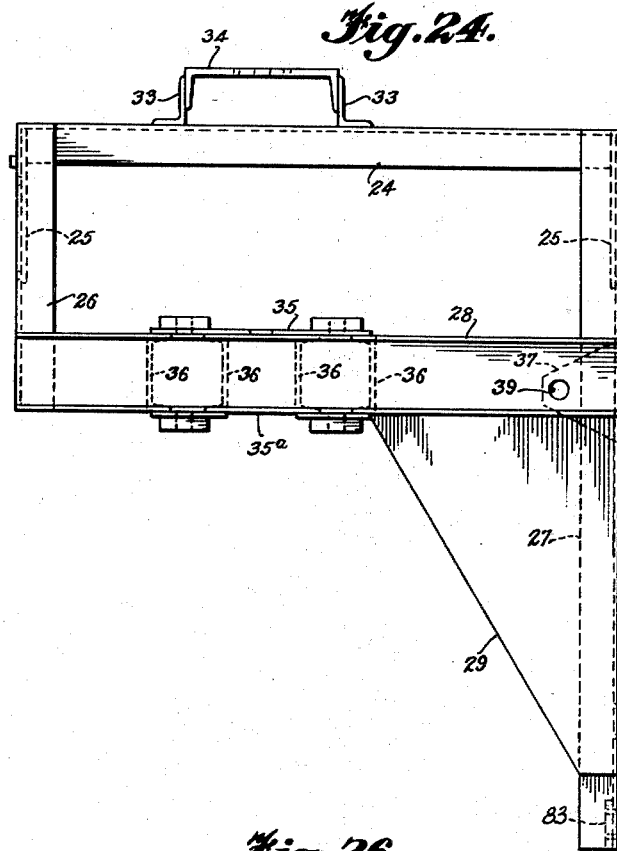
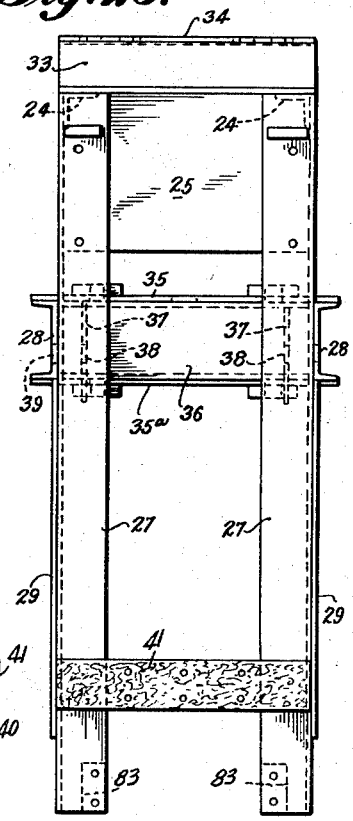
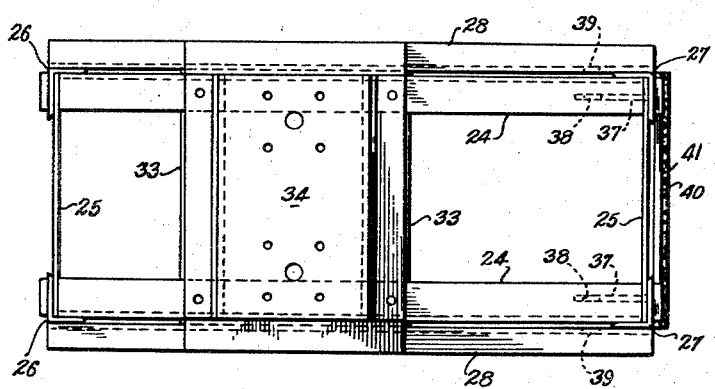
Inventors
Walton L. Woody and
Beauford E. Gavin, Sr.
Attorney

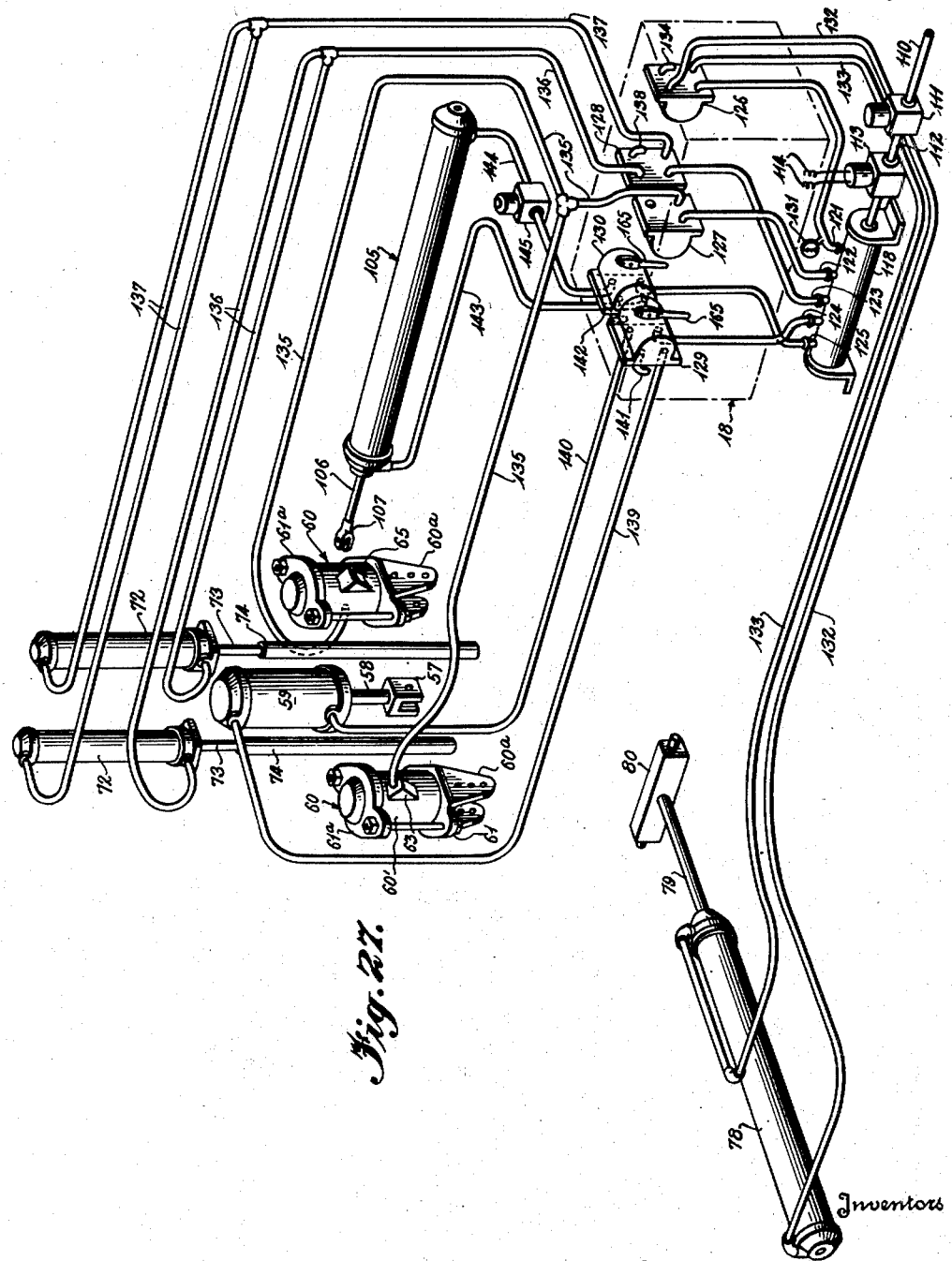

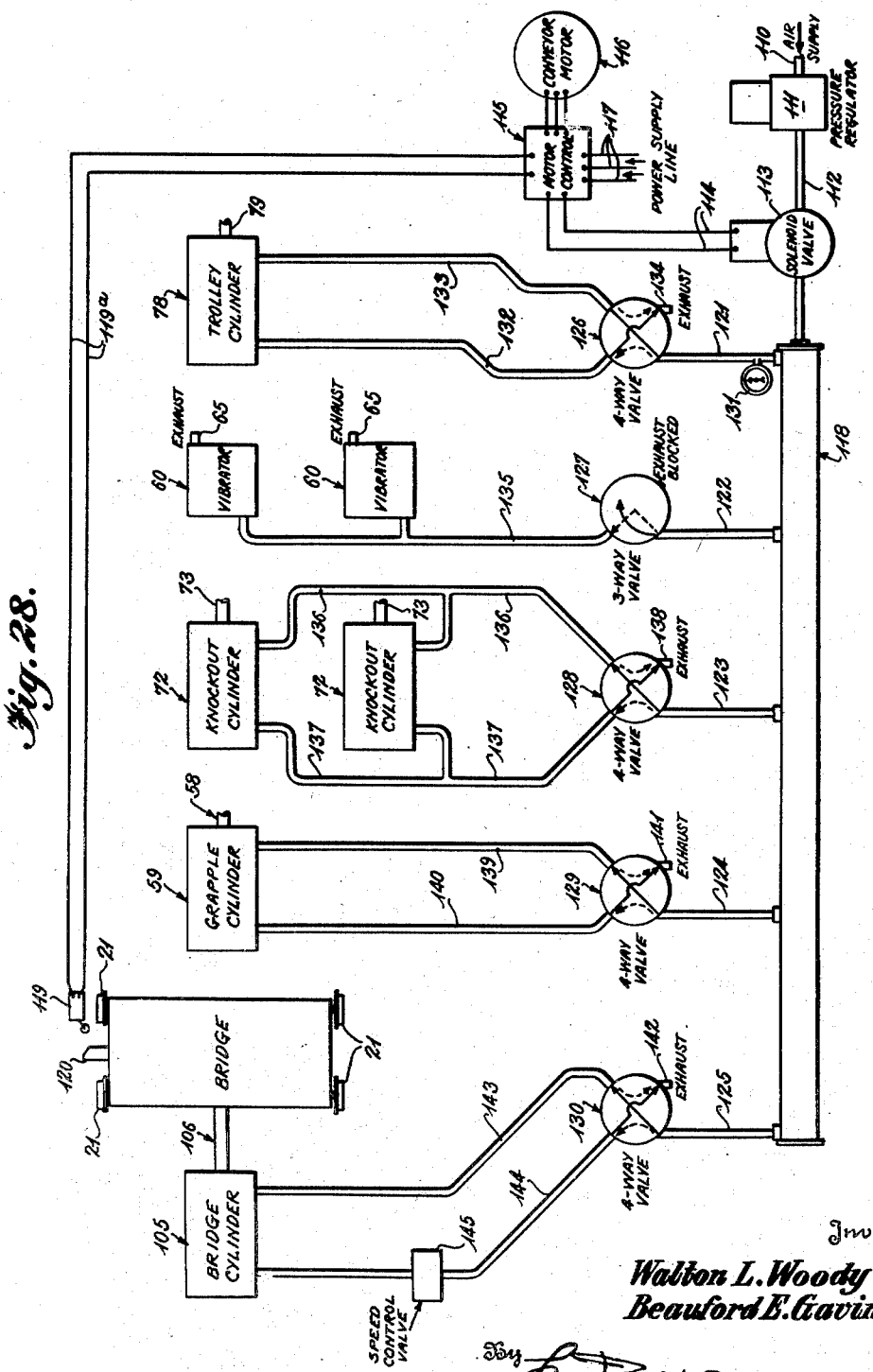

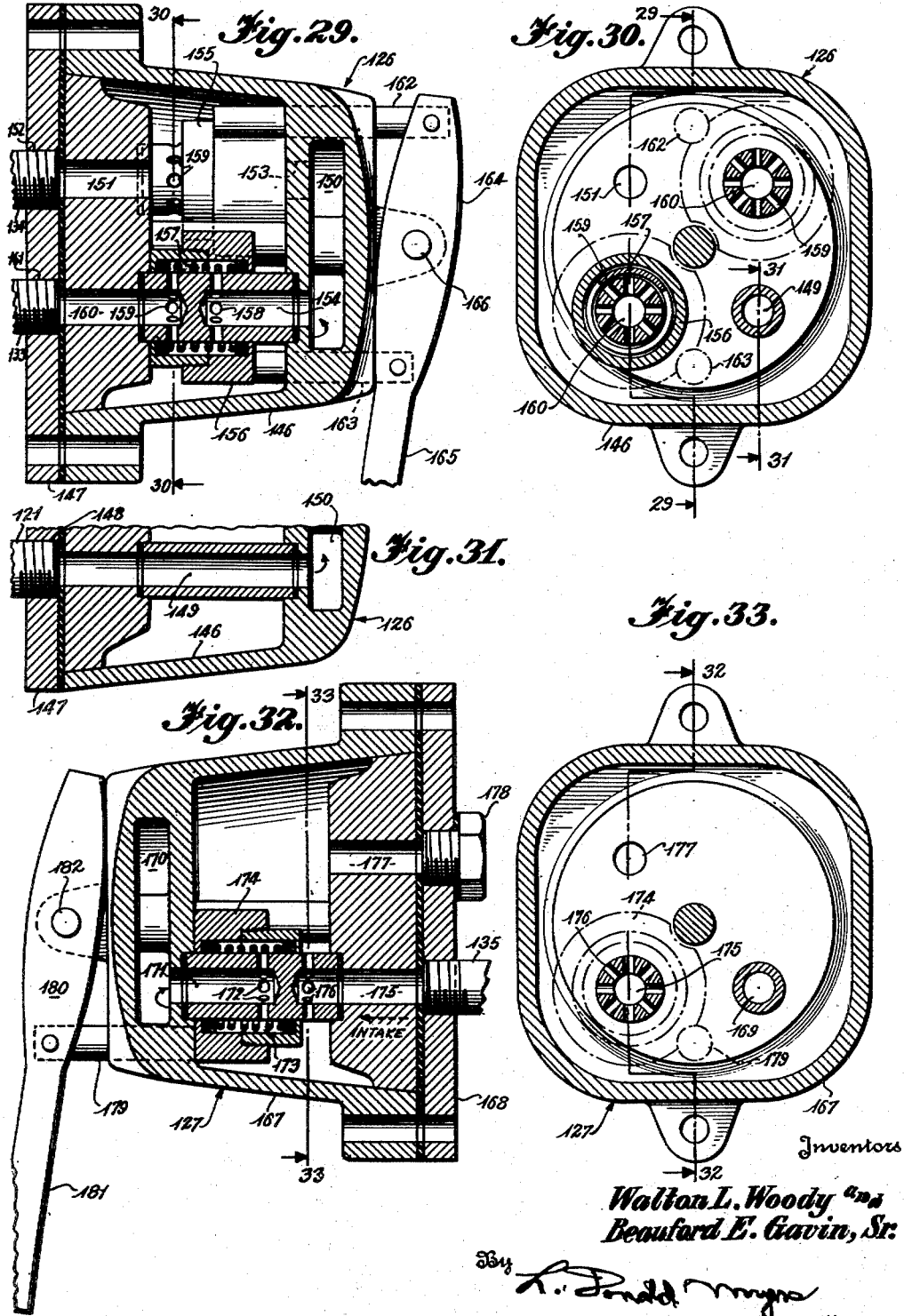

Oct. 10, 1950     W. L. WOODY ET AL     2,525,572
AUTOMATIC SHAKEOUT MACHINE FOR FLASK TYPE MOLDS
Filed March 23, 1948     19 Sheets-Sheet 14

Fig. 34.
MACHINE AND VALVE CYCLE

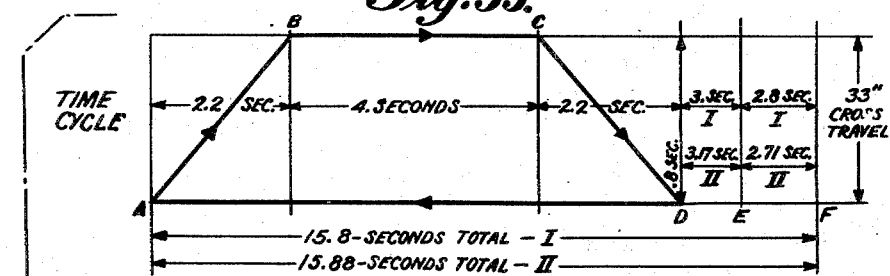

Fig. 35.

TIME CYCLE— (REFER TO LETTERS ON CHART ABOVE)

```
              I      II
A ———————— .8 ——— .8 — SEC. TO GRIP FLASK
A TO B ———— 2.2 ——— 2.2 — SEC. CROSS TRAVEL FORWARD  } FORWARD
B TO C ———— 4.0 ——— 4.0 — SEC. SHAKEOUT               } TRAVEL OF
C TO D ———— 2.2 ——— 2.2 — SEC. CROSS TRAVEL RETURN    } BRIDGE
D ———————— .8 ——— .8 — SEC. TO RELEASE FLASK
D TO E ———— 3.0 ——— 3.17 — SEC. BRIDGE RETURN
E TO F ———— 2.8 ——— 2.71 — SEC. DWELL PERIOD
TOTAL— 15.8 — 15.88 — SECONDS
    NOTES: THAT A AND D, THE FLASK
    TIME TO GRIP AND RELEASE WILL OVERLAP
    THE FORWARD TRAVEL OF BRIDGE TROLLEY
```

Inventors
Walton L. Woody and
Beauford E. Gavin, Sr.
By L. Donald Myers
Attorney

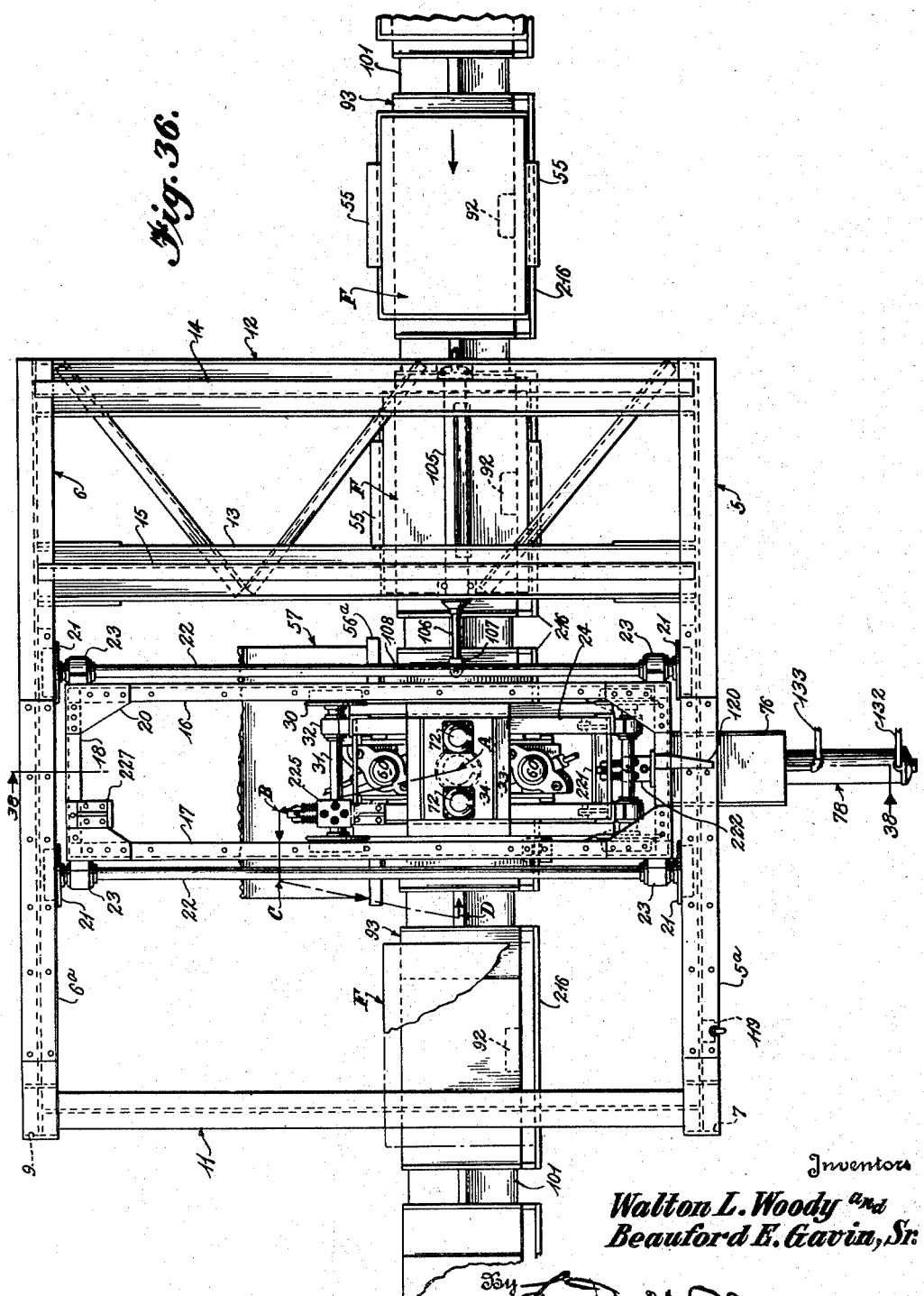

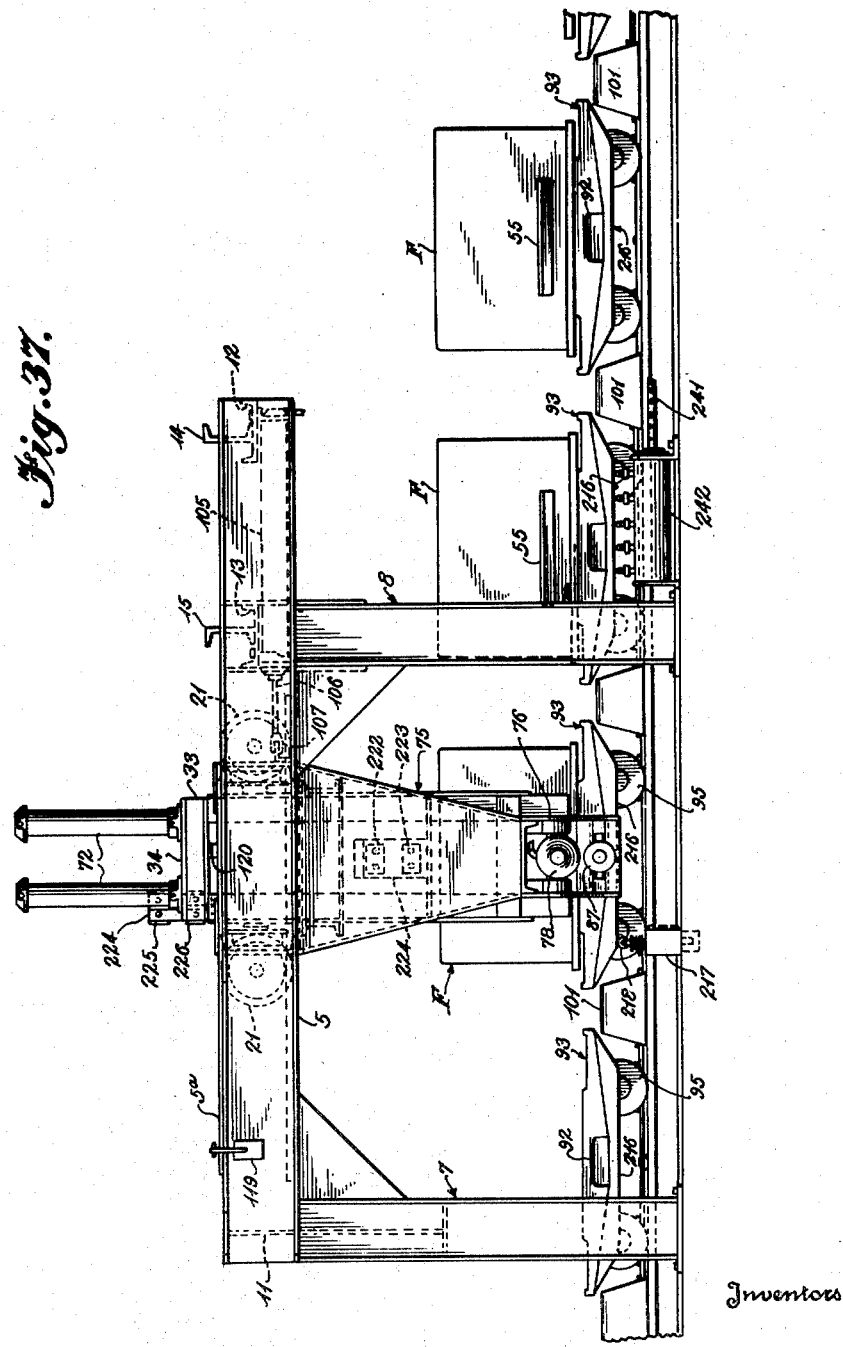

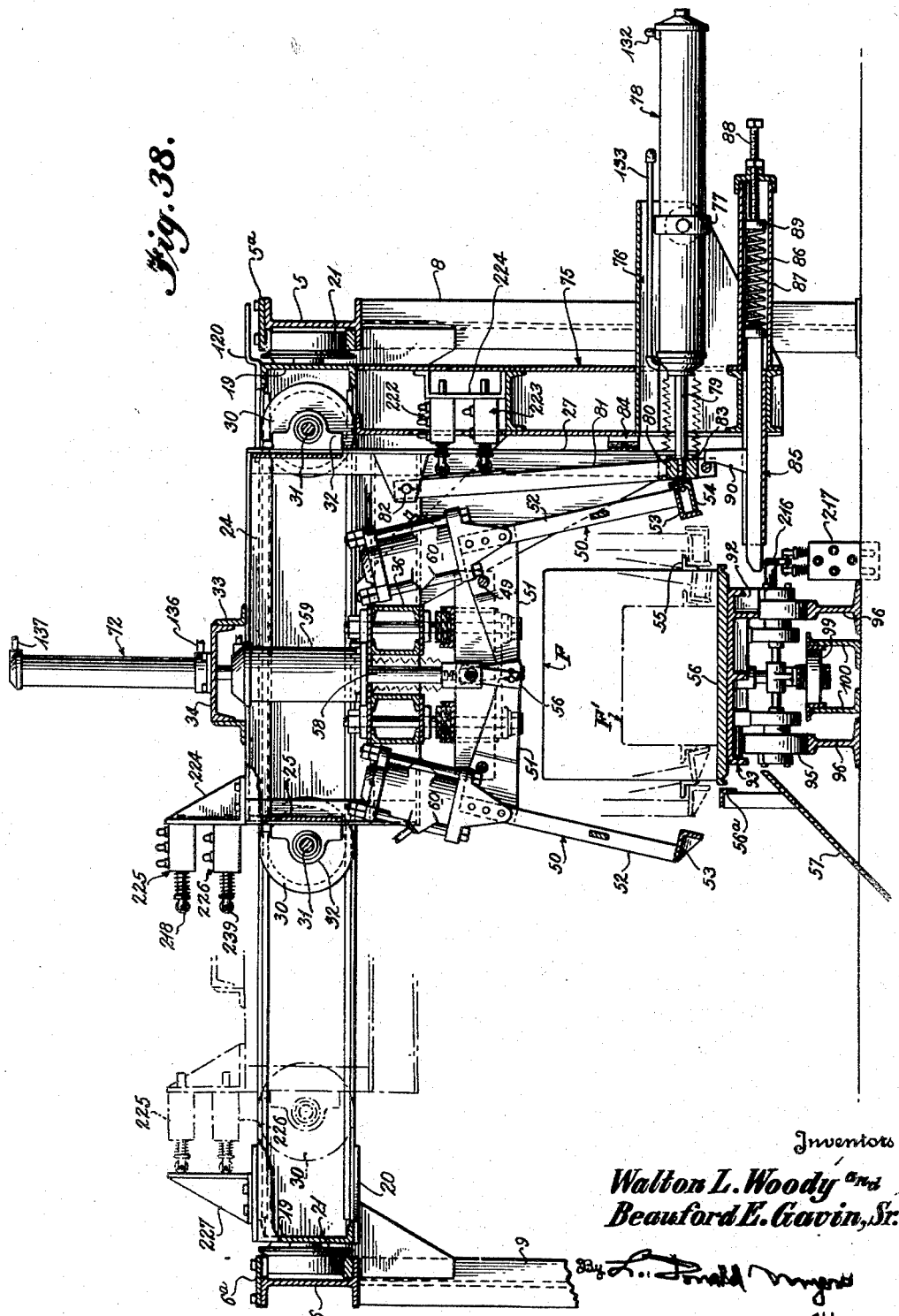

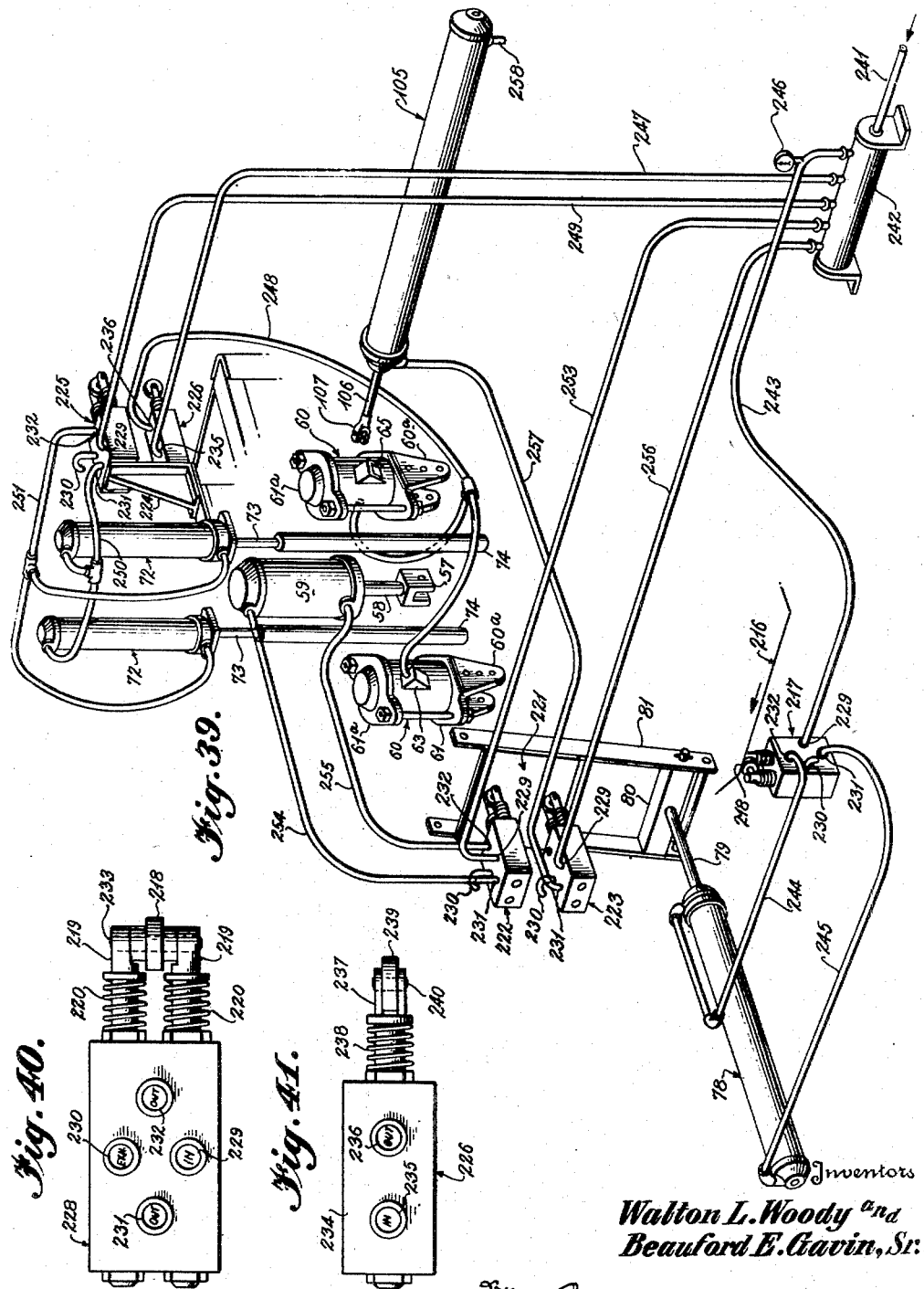

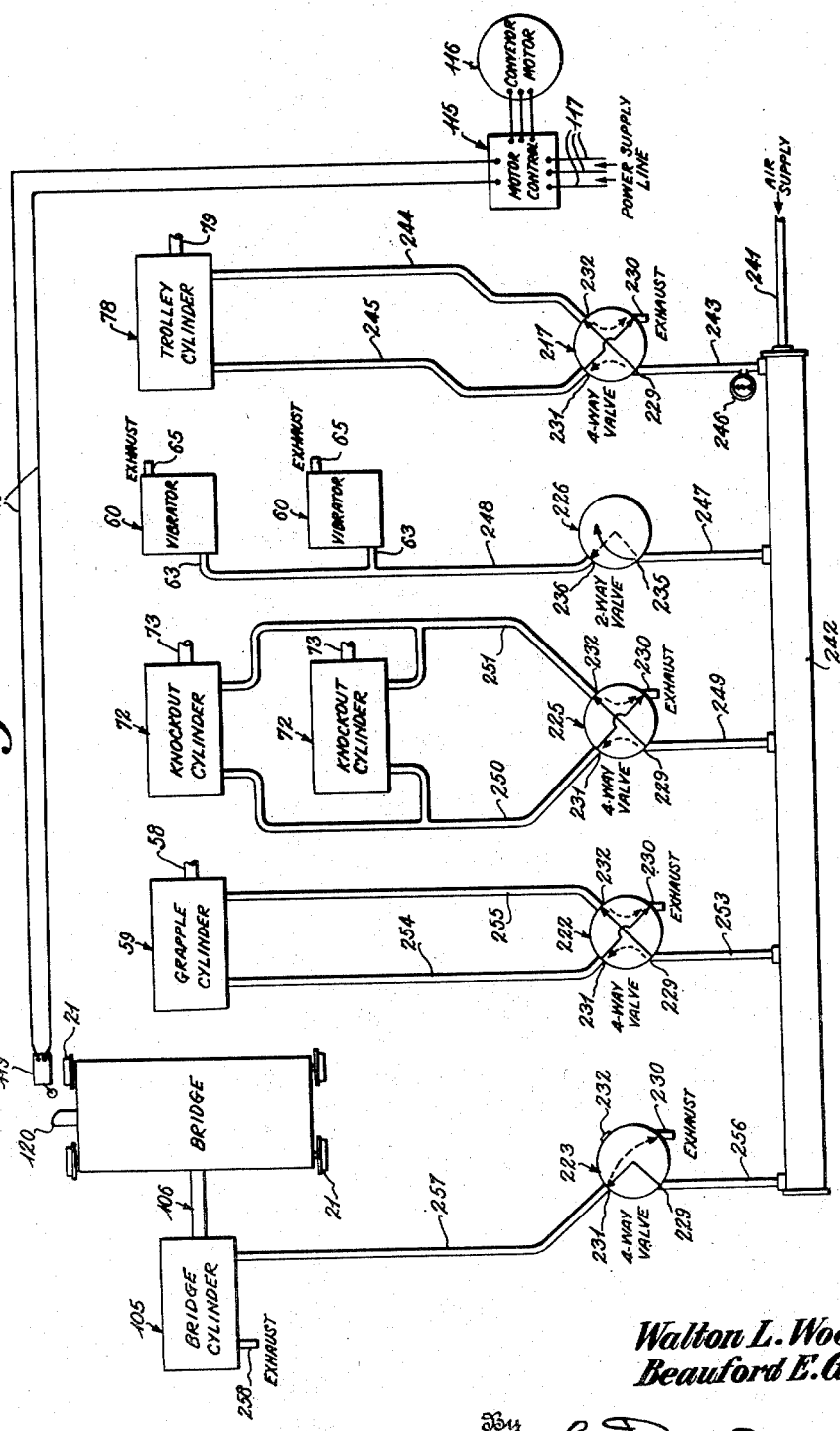

Patented Oct. 10, 1950

2,525,572

UNITED STATES PATENT OFFICE 2,525,572

AUTOMATIC SHAKEOUT MACHINE FOR FLASK TYPE MOLDS

Walton L. Woody, Shaker Heights, Ohio, and Beauford E. Gavin, Sr., Indianapolis, Ind., assignors to National Malleable and Steel Castings Company, Cleveland, Ohio, a corporation of Ohio Application March 23, 1948, Serial No. 16,498

10 Claims. (Cl. 22—1)

This invention relates to automatic shakeout machines for flask type molds.

In the production of metal castings by the use of sand molds formed in flasks having separable bottom boards, it is a usual practice for the molders to place the molds with their flasks, either manually or with the aid of mechanical means, on a suitable form of endless conveyor so that the flasks will be carried successively through the pouring, cooling, and shakeout zones. The same conveyor may be employed for returning the empty flasks to the molding zone for reuse. The mold conveyor may be driven so as to cause the flasks to travel continuously or intermittently, depending on such factors as the sizes of the castings being produced and/or the facilities employed for pouring and for shaking out the castings and sand from the flasks.

The operations that are performed at the shakeout zone of such a flask type mold conveyor system create working conditions that are as bad as, if not worse than, those encountered at any other location in a modern foundry. This is due to the large amount of fine mold sand that is released to the atmosphere as dust each time a flask is emptied, and to the laborious nature of the work. The usual practice is to employ two or more men, at a relatively high hourly rate, to perform the required operations at the shakeout zone.

It is a primary object of this invention to provide a machine which will operate entirely automatically, and in properly timed relation to the travel of a flask type mold conveyor, to remove the molds and their flasks from the conveyor, as they reach the shakeout zone; to carry the molds and flasks to a location over a vibrating screen or grid, employed for separating the sand from the hot castings, or to a location over a conveyor leading to such a vibrating screen or grid; to dislodge the sand and castings from the flasks at said location; and to return the empty flasks to the same conveyor.

A further important object of the invention is the provision of a fully automatic shakeout machine for a continuously traveling flask type mold conveyor which will function to remove a mold and its flask from a given conveyor tray as the latter reaches the shakeout zone; to dislodge the sand and casting from the flask; to replace the empty flask on the same conveyor tray, which in the meantime has traveled to a new location; and to condition the machine to perform the same series of operations for the mold and flask carried by the next succeeding conveyor tray as it reaches the shakeout zone.

Another primary object of the invention is to provide a fully automatic shakeout machine for flask type molds which will function without adjustments to remove the sand and castings from a series of continuously advancing flasks which may vary in size within a given range and regardless of the order or sequence in which the different sized flasks reach the shakeout machine.

A still further important object of the invention is the provision of a machine which will operate entirely automatically, and in properly timed relation to the continuous travel of a flask type mold conveyor, to perform a complete shakeout operation on each flask as it is presented to the machine by the conveyor; each one of said complete shakeout operations comprising lifting the mold and its flask from its conveyor tray while permitting the bottom board of the flask to remain on the tray; carrying the flask to a location paralleling the path of travel of the conveyor; dislodging the casting and sand from the flask while the latter is at said parallel location; returning the empty flask to the conveyor tray and bottom board from which it was removed; and returning to the starting point in time to repeat the same operation on the next mold and flask as they reach the shakeout machine.

Another object of the invention is to provide a fully automatic shakeout machine for flask type molds having a flask handling mechanism that is supported for movements longitudinally and transversely of the direction of travel of the mold conveyor served by the machine so that the flasks, as they are successively presented to the machine, may be picked up and carried to a shakeout location laterally of the conveyor path and then returned to the same position on the conveyor.

A further object of the invention is the provision of a fully automatic shakeout machine for serving a continuously traveling flask type mold conveyor in which the flask handling mechanism of the machine is moved both laterally and longitudinally of the direction of travel of the conveyor to enable the flasks to be carried to a shakeout location paralleling the conveyor path and then returned to the continuously traveling conveyor, and in which the said movable flask handling mechanism is so connected to the continuously traveling conveyor, during the portion of each shakeout cycle when a flask is separated from the conveyor, that each empty flask will be returned to the exact position on the conveyor from which it was removed.

Other objects and advantages of the invention will be apparent during the course of the following description.

In the accompanying drawings forming a part of this specification and in which like numerals are employed to designate like parts throughout the same.

Figure 2:
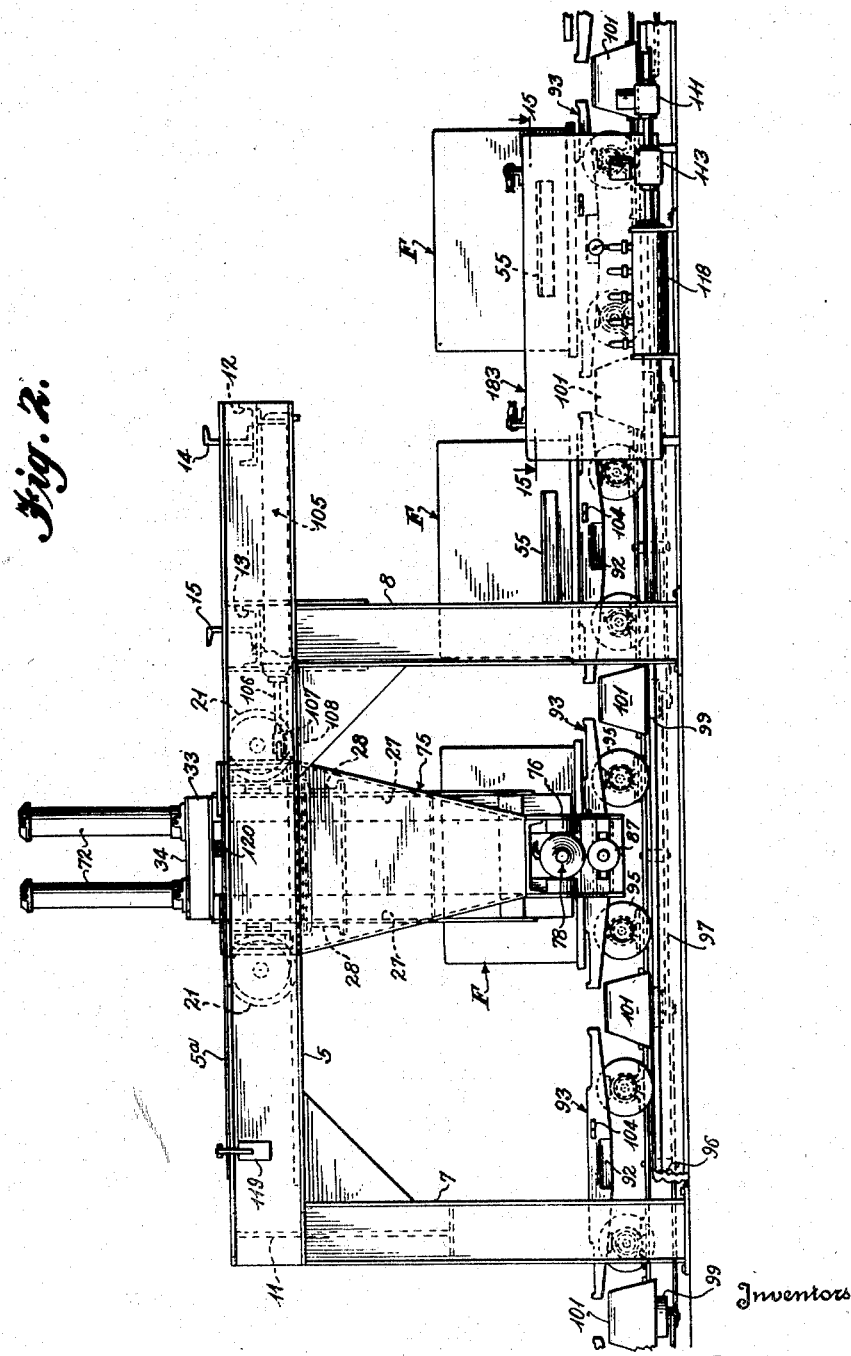
Figure 3:
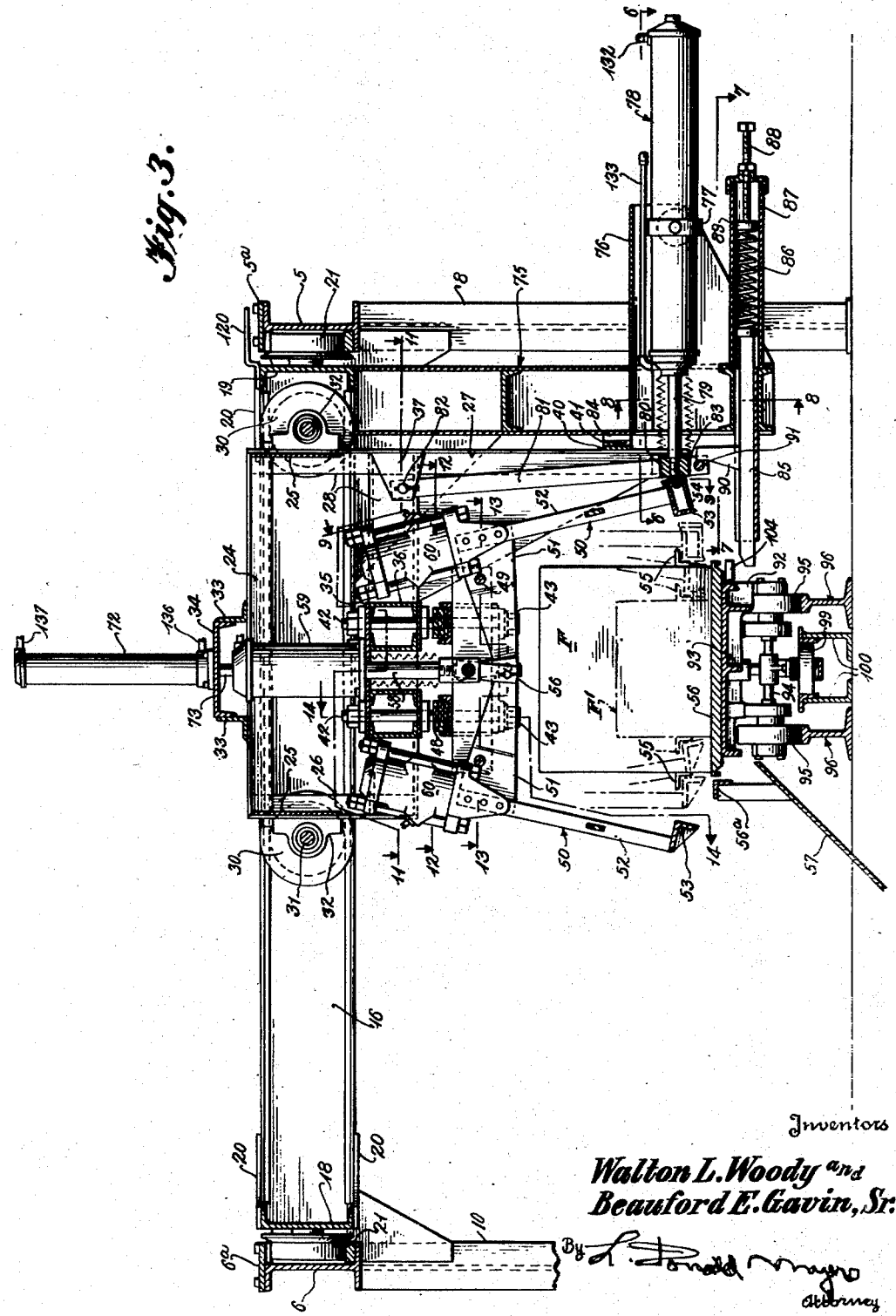
Figure 4:
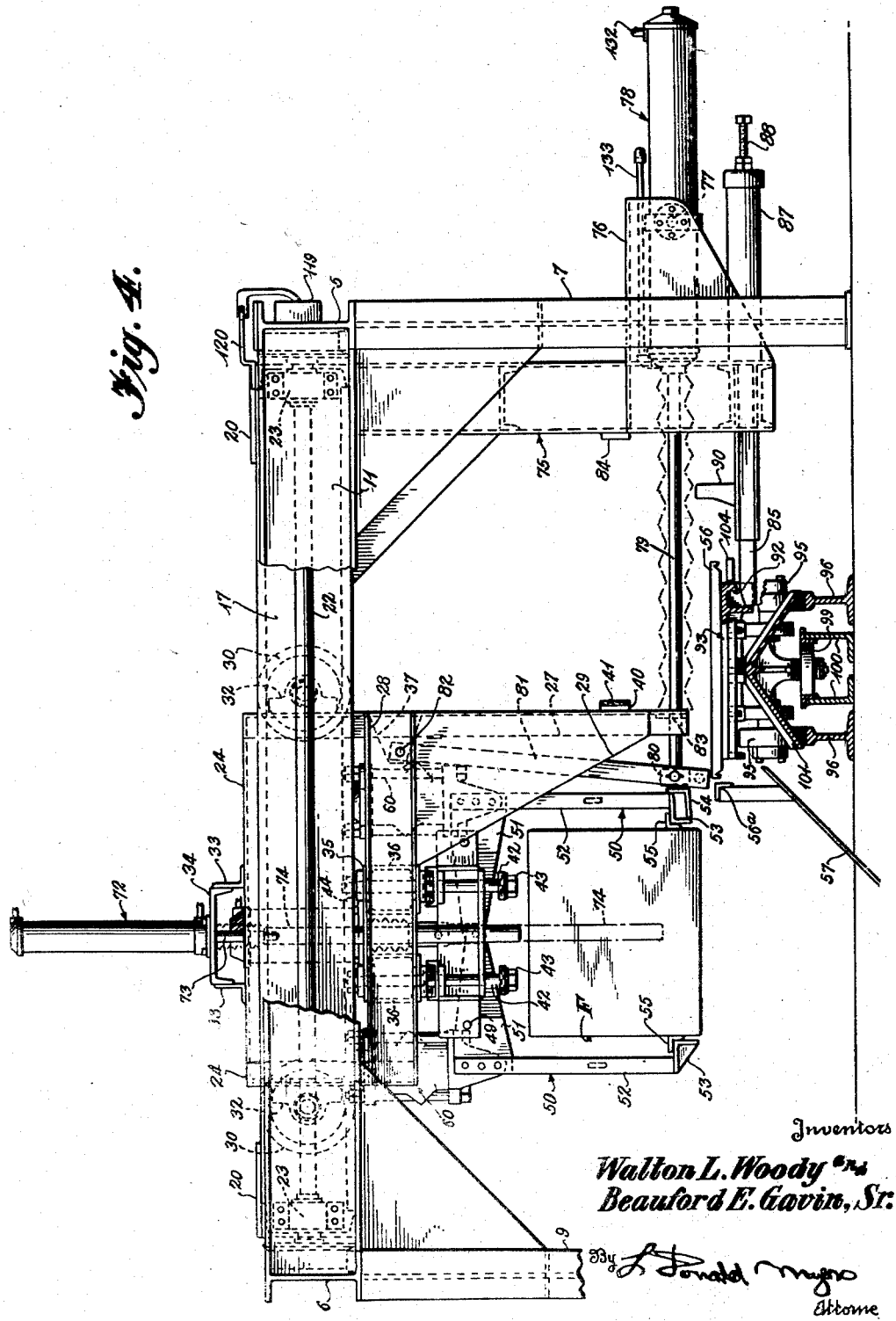
Figure 5:
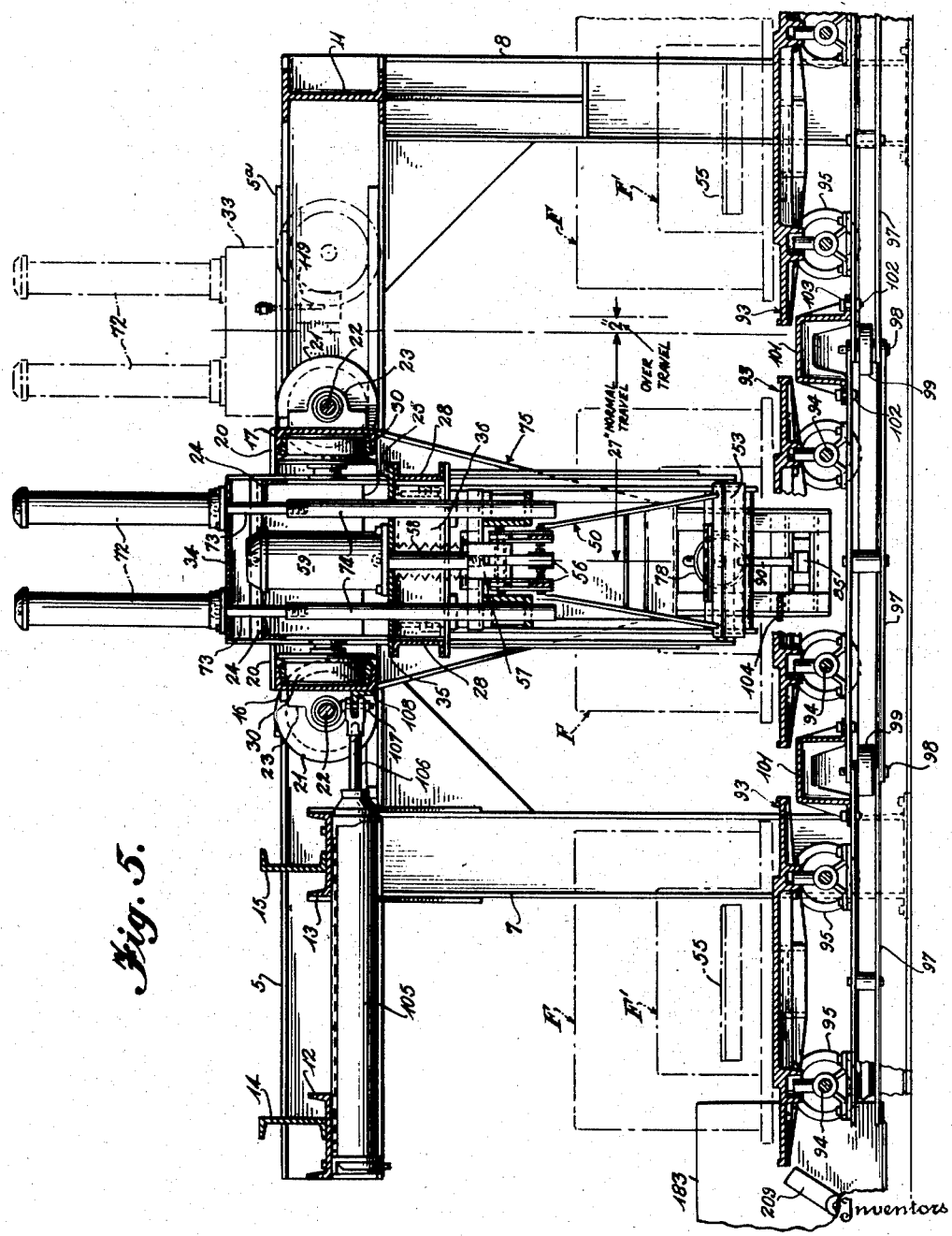

Figure 1 is a plan view of one automatic shakeout machine for flask type molds embodying this invention, and illustrated in operative relation to a suitable conveyor for delivering the mold flasks successively to the shakeout machine, Figure 2 is a side elevational view of the automatic shakeout machine and conveyor illustrated in Fig. 1, Figure 3 is a transverse, vertical sectional view taken on line 3—3 of Fig. 1, Figure 4 is an end elevational view of the automatic shakeout machine and a transverse sectional view of the conveyor, when viewed from the conveyor departure end of the machine, Figure 5 is a longitudinal, vertical sectional view taken on line 5—5 of Fig. 1, Figure 6 is a detail, horizontal sectional view taken on line 6—6 of Fig. 3, Figure 7 is a detail, horizontal sectional view taken on line 7—7 of Fig. 3, Figure 8 is a detail, vertical sectional view taken on line 8—8 of Fig. 3, Figure 9 is a detail, elevational view taken on line 9—9 of Fig. 3, Figure 10 is a detail, vertical sectional view taken on lines 10—10 of Fig. 9, Figure 11 is a detail, horizontal sectional view taken on line 11—11 of Fig. 3, Figure 12 is a detail, horizontal sectional view taken on line 12—12 of Fig. 3, Figure 13 is a detail, horizontal sectional view taken on lines 13—13 of Fig. 3, Figure 14 is a detail, vertical sectional view taken on lines 14—14 of Fig. 3, Figure 15 is a detail, horizontal view, partly in section and partly in plan, and taken on line 15—15 of Fig. 2, Figure 16 is a detail, vertical sectional view taken on line 16—16 of Fig. 15, Figure 17 is a detail, vertical sectional view taken on line 17—17 of Fig. 15, Figure 18 is a detail, vertical sectional view taken on line 18—18 of Fig. 17, Figure 19 is a detail, vertical sectional view taken on line 19—19 of Fig. 15, Figure 20 is a detail, vertical sectional view taken on line 20—20 of Fig. 19, Figure 21 is a detail, vertical sectional view taken on line 21—21 of Fig. 15, Figure 22 is a detail, vertical sectional view taken on line 22—22 of Fig. 21, Figure 23 is a detail, vertical sectional view taken on line 23—23 of Fig. 15, Figure 24 is a side elevational view showing in detail the main frame of the trolley, Figure 25 is an end elevational view of said trolley frame, Figure 26 is a top plan view of the trolley frame, Figure 27 is a perspective, schematic view of the entire pressure fluid system that is incorporated in the automatic shakeout machine shown in the preceding figures, Figure 28 is a diagrammatic view of the pressure fluid system illustrated in Fig. 27.

Figure 29 is a vertical sectional view taken on lines 29—29 of Fig. 30 and illustrates the details of a 4-way pressure fluid control valve that is employed as a part of the system illustrated in Figs. 27 and 28, Figure 30 is a transverse sectional view taken on line 30—30 of Fig. 29, Figure 31 is a partial sectional view taken on line 31—31 of Fig. 30, Figure 32 is a transverse sectional view of a 3-way pressure fluid control valve employed as a part of the system illustrated in Figs. 24 and 25, and taken on lines 32—32 of Fig. 33, Figure 33 is a transverse sectional view taken on line 33—33 of Fig. 32, Figure 34 is a chart illustrating the motion cycle, in inches, of the automatic shakeout machine, illustrated in the preceding figures, as produced by the proper sequence of operation of the control valves for the pressure fluid system illustrated in Figs. 27 and 28, Figure 35 is a chart illustrating the time cycle, in seconds, and should be considered with the motion cycle chart of Fig. 34.

Figure 36 is a similar view to Fig. 1 but illustrates a modified form of automatic shakeout machine for flask type molds that includes a different control system, Figure 37 is a side elevational view of the modified form of automatic shakeout machine illustrated in Fig. 36, Figure 38 is a transverse sectional view taken on line 38—38 of Fig. 36, Figure 39 is a perspective schematic view of the entire pressure fluid system that is incorporated in the machine shown in Figs. 36 to 38 inclusive, Figure 40 is a detail, plan view of a 4-way pressure fluid control valve that is employed in this modified form of automatic shakeout machine, Figure 41 is a similar view to Fig. 40 but illustrates a 2-way pressure fluid control valve, and Figure 42 is a diagrammatic view of the pressure fluid system illustrated in Fig. 39.

In the drawings, wherein for the purpose of illustration are shown the preferred embodiments of this invention, and first particularly referring to Figs. 1 to 5, inclusive, there is disclosed an overhead trackway including the two parallel rails 5 and 6 supported at suitable, longitudinally spaced points by the four corner posts or uprights 7, 8, 9 and 10. These uprights or posts are suitably anchored at their lower ends to the floor on which the entire machine is mounted. It will be seen by inspecting Figs. 1, 2 and 5 that longitudinal sections 5a and 6a of the top flanges of the rails 5 and 6, respectively, are made removable to permit a bridge structure, referred to later, to be removed from the trackway.

A transverse I-beam 11 is positioned at one end of the overhead trackway and is employed for cross bracing the rails 5 and 6. At the opposite end of the overhead trackway, Figs. 1, 2 and 5 disclose the use of two transversely extending channels 12 and 13, having their main webs horizontally arranged, and two channels 14 and 15, having their main webs vertically arranged, for transversely bracing the rails 5 and 6.

The overhead trackway is employed for supporting a bridge structure for longitudinal travel along the rails 5 and 6. This bridge structure is best illustrated in Figs. 1 to 5, inclusive, as consisting of a rectangular frame that is horizontally arranged in the plane of the rails 5 and 6. The bridge structure is formed of the two side rails 16 and 17, which are of channel shape and have their main webs arranged vertically, and the two end channels 18 and 19, which transversely brace the longitudinal rails 16 and 17 and are connected thereto by suitable corner webs or plates 20.

The bridge structure is supported for travel along the rails 5 and 6 by the four corner wheels 21 rotatably mounted on the axles 22 mounted on the outer sides of the longitudinal rails 16 and 17 by the mounts 23.

Mounted for longitudinal movements along the side rails 16 and 17 of the bridge structure is a trolley. The detail features of construction of this trolley are best illustrated in Figs. 1, 3, 4, 5, 11 to 14, inclusive, and 24 to 26, inclusive.

The main frame of this trolley consists of a box-like main body portion formed of the two parallel, angle-iron top bars 24, the two end plates 25, the two relatively short corner angles or uprights 26, the two relatively long corner angles or uprights 27, and the opposite, lower channels 28.

These several structural elements are suitably welded together at their contacting portions. Substantially triangularly shaped web plates 29 are welded to the bottom flanges of the side channels 28 and to the side flanges of the corner angles 27 to brace the depending portions or extensions of these corner members.

The trolley is mounted for longitudinal movements on the side rails 16 and 17 of the bridge structure by the four corner wheels 30 rotatable on the axles 31 attached to the four corner members 26 and 27 by the mounts 32.

Figs. 1 to 5, inclusive, and 24 to 26, inclusive, disclose the formation of a transversely extending platform on the top of the trolley frame by the two parallel angle members 33 and the inverted channel member 34.

Figs. 3 to 5, inclusive, 11, 14, 24 and 25 illustrate a transverse platform formed on the side channel members 28 of the trolley frame by the top plate 35, the bottom plate 35a, and the two pairs of opposed channels 36.

Figs. 3, 4, 11, and 24 to 26, inclusive, disclose the corner angle members 27 as having attached thereto, in parallel spaced relation to the side channels 28, the mounting brackets 37 provided with apertures 38 that are in alinement with the apertures 39 formed in the side channels 28.

Figs. 3, 4 and 24 to 26, inclusive, illustrate the lower end portions of the angle corner members 27 as having connected thereto a transverse plate 40 adapted to carry a resilient buffer or cushion member 41.

The platform formed by the plates 35 and 35a and the two pairs of channel members 36 is employed for mounting mold flask handling grapple mechanism on the frame of the trolley. This grapple mechanism will be described in detail by referring to Figs. 3 to 5, inclusive, and 9 to 14, inclusive.

Four suspension bolts 42, each having a permanent head 43 at its lower end and a removable nut 44 at its upper end, pass downwardly through the supporting platform formed by the plates 35 and 35a and the channel members 36. These four suspension bolts support a frame that consists of the two spaced, parallel side plates 45 having lateral attachment flanges 46 fastened to their outer faces and through which the suspension bolts 42 pass. Extending transversely across the top edges of the side plates 45 are two channel members 47 through the opposite projecting end portions of which the four suspension bolts 42 pass.

This frame will partake of vertical movements relative to the suspension bolts 42 and for that reason the channels 47 have mounted on the upper sides thereof the yieldable cushion elements 48 which will engage the bottom plate 35a attached to the side channels 28.

Two pins 49 pass through the opposite end portions of the side plates 45 and are employed for pivotally connecting the opposed grapple arms 50 to the supporting frame. Each one of these grapple arms consists of a substantially horizontally extending branch 51, through which the pivot pin 49 passes, and a depending, or substantially vertically extending, branch 52. The lower ends of the two depending branches 52 have gripping shoes 53 attached thereto. As is clearly illustrated in Figs. 3, 4, 9 and 10, one of these gripping shoes 53 has attached thereto a bumper member 54, the function of which will be described at a later point.

Figs. 3 to 5, inclusive, and 11 to 13, inclusive, disclose the inner ends of the horizontal branches 51 as being pivotally connected by the pins 54 and the several links 56 to an attachment block 57 fastened to the reciprocating piston rod 58 of the pressure fluid operated cylinder and piston unit 59. This unit 59 is suitably mounted on the top plate 35 of the lower platform formed on the trolley. It will be appreciated that vertical movements of the piston, not shown, within the cylinder 59 will cause the piston rod 58 to pivot the grapple arms 50 about their pivot pins 49.

This pivotal movement of the grapple arms 50 is illustrated in Figs. 3 and 4 as functioning to cause the same to seize and hold mold flasks that are presented to the automatic shakeout machine by a suitable mold conveyor. These two figures disclose in full lines a mold flask F of the largest size that the illustrated grapple mechanism is capable of handling. Fig. 3 illustrates in broken lines a mold flask F' of the smallest size that can be handled by the illustrated grapple mechanism. It will be understood that Fig. 3 illustrates the vertical, transverse dimensions of the two extremes in mold flasks while Fig. 5 illustrates the two extremes in mold flasks with reference to their vertical, longitudinal dimensions.

Figs. 3 to 5, inclusive, illustrate the provision of gripping lugs or flanges 55 fastened to the opposite sides of the mold flasks F and F' to enable the shoes 53 of the grapple arms to properly seize and hold the flasks. It is to be understood that this automatic shakeout machine is intended primarily to handle tight flask molds and that the gripping lugs 55 are attached to the drag parts of such flasks.

By carefully comparing the different illustrated positions of the grapple arms 50 in Figs. 3 and 4, it will be seen that the initial upward movement of the piston rod 58 will cause the grapple arms 50 to swing so as to engage their shoes 53 with the gripping lugs 55 of the mold flask presented to the shakeout machine. Further upward movement of the piston rod 58, after the mold flask has been seized, causes the entire frame supported by the suspension bolts 42, the grapple arms 50, and the seized flask F to be elevated or raised as a unit. This vertical movement continues until the cushioning members 48 engage the bottom plate 35a of the lower trolley platform on which the grapple mechanism is mounted. The vertical movement raises the seized flask away from its separable bottom board 56, see Figs. 3 and 4.

Therefore, the bottom board is left on the conveyor car or tray that presents the mold flask to the automatic shakeout machine.

Fig. 3 illustrates the operation of the grapple mechanism to seize a mold flask F that has been presented to the shakeout zone of the conveyor system, or to the automatic shakeout machine that is located at said zone. Fig. 4 shows the trolley as having been moved longitudinally of the bridge structure to shift the grapple mechanism and its seized mold flask F to a location paralleling the path of the conveyor, or until the mold flask is located over the inclined plate 57 that leads to any suitable mechanism, not shown, for handling the sand and hot castings dislodged from the flasks. For example, the dislodged sand and castings may be delivered to an apron conveyor or to an oscillating, trough conveyor which will carry the sand and castings to a vibrating screen or grid that will separate the sand from the castings, or the inclined plate 57 may deliver the sand and hot castings directly to a vibrating screen or grid.

The mechanism employed for moving the grapple mechanism with a seized mold flask from the path of the conveyor, illustrated in Fig. 3, to the shakeout location, illustrated in Fig. 4, will be explained in detail at a later point. The mechanism employed for automatically dislodging the sand and castings from the mold flasks moved to the lateral shakeout location now will be described in detail.

One means employed for dislodging sand and castings from the mold flasks consists of a pressure fluid operated vibrator unit 60 attached to each grapple arm 50, see Figs. 3, 4 and 9 to 12, inclusive. By particularly considering Figs. 9 and 10, it will be seen that each vibrator unit 60 consists of a bottom plate 61, having attachment ears 60a depending therefrom and employed for mounting the unit on its grapple arm 50, a cylinder body 60', and a top plate 61a. Two bolts 62 clamp together the two plates 61 and 61a and the cylinder body 60'.

Fig. 10 discloses the cylinder body 60' as being formed to provide an inlet chamber 63 having communicating therewith an annular inlet channel 64 that opens into the cylinder bore. Diametrically opposite the inlet chamber 63, the cylinder body is provided with an exhaust chamber 65 that is connected to the bore of the cylinder body 6 by two axially spaced exhaust channels 66.

The piston body 67 is divided into three enlarged parts by the two annular, peripheral grooves 68 and 69. A plurality of axial ducts 70 establish communication between the peripheral groove 68 and the space in the cylinder below the bottom end of the piston 67. A single angular duct 71 establishes communication between the peripheral groove 69 and the space in the cylinder above the upper end of the piston 67.

The operation of this type of pressure fluid vibrator unit will be explained as follows:

Starting with the piston 67 in its lowermost position, as seen in Fig. 10, the admission of pressure fluid from a suitable source to the inlet chamber 63 causes the fluid to flow through the inlet channel 64 into the annular space formed by the peripheral groove 68 of the piston and through the ducts 70 to the lower end of the cylinder. At this time, the upper end of the cylinder is open to the atmosphere through the duct 71, the upper exhaust channel 66 and the exhaust chamber 65. The flow of pressure fluid to the lower end of the cylinder causes the piston to move upwardly and deliver a hammer blow against the top plate 61a of the unit.

By the time the piston 67 has moved upwardly through the cylinder to the upper limit of its stroke, the space in the cylinder below the lower end of the piston has been cut off from delivery of pressure fluid through the channel 64 and has been placed in communication with the lower exhaust channel 66 so that the pressure fluid will be released to the atmosphere. When the lower end of the cylinder bore has been exhausted, the piston 67 will be returned by its own weight and by the comparatively small volume of air trapped above the upper end of the piston after the periphery groove 69 has moved upwardly beyond the upper margin of the exhaust channel 66.

If pressure fluid is constantly supplied to the inlet chamber 63 of the vibrator unit, the piston 67 will be caused to reciprocate at a rapid rate for delivering repeated hammer blows against the top plate 61a. These hammer blows will be transmitted to the associated grapple arm 50. The vibrations that are delivered to the two grapple arms by their respective vibrator units 60 will be transmitted to the seized mold flasks to either materially assist or actually effect the shaking out of the sand and casting.

To make certain that the castings will be dislodged from the flasks and the hardened sand will be broken loose so that it will be shaken from the flask by the vibrations delivered to the latter, two knockout units are employed. These units are best illustrated in Figs. 1 to 5, inclusive, and 11 to 13, inclusive.

These knockout units consist of the double-acting cylinders 72 mounted in parallelism on the upper platform formed on the trolley by the inverted channel member 34 and the two angle members 33. Figs. 4 and 5 illustrate these piston and cylinder units 72 as each being provided with a piston rod 73 projected from its lower end. Each piston rod has suitably attached to its lower end the knockout bar or rod 74. These bars or rods are guided by their passage through the top and bottom plates 35 and 35a of the lower platform carried by the trolley and through the mounting plates 46 of the movable frame of the grapple mechanism. The locations of these two knockout rods or bars 74 are best illustrated in Figs. 5 and 11 to 13, inclusive.

Figs. 4 and 5 disclose in full lines the normal positions of these knockout bars or rods 74 when they are elevated or retracted to permit the grapple arms 50 to seize a mold flask F and carry it from the conveyor path over to the shakeout location. The knockout bars or rods 74 normally are maintained in their retracted or elevated positions by the application of pressure fluid to the lower ends of the piston and cylinder units 72.

When a casting is to be positively dislodged from a mold flask in the shakeout position, pressure fluid is exhausted from the lower ends of the two cylinder and piston units 72 and is admitted to the upper ends of these units. This reversal of the application of pressure fluid to the cylinder and piston units 72 causes the knockout bars or rods 74 to move downwardly into the broken line position illustrated in Fig. 4. It will be seen that the knickout bars or rods are moved a substantial distance downwardly through the mold flask F. After the knockout bars or rods have performed their intended function, the application of pressure fluid to the piston and cylinder units 72 is reversed and the knockout bars or rods are returned to the full line positions.

The mechanism employed for moving the trolley and its grapple mechanism longitudinally of the bridge structure, or between the path of the conveyor and the lateral shakeout location, now will be described by referring to Figs. 1 to 8, inclusive, and 11.

These several figures disclose one end of the bridge structure as having depending therefrom an internally braced, box-like frame 75. The lower end portion of this depending frame has attached thereto a laterally, outwardly, projecting hollow arm 76 which is best illustrated in Figs. 3, 4 and 6 as being employed for pivotally supporting, by means of the trunnioned mount 77, the substantially horizontally extending, double-acting cylinder and piston unit 78.

Figs. 3, 4 and 6 best illustrate the piston rod 79 of the unit 78 as having its outer end attached to a horizontally arranged cross-bar 80 pivotally connected at its opposite ends to the lower portion of a vertically extending arm 81. This arm is pivotally supported at its upper end by the pins 82 illustrated in Fig. 11 as passing through the apertures 38 and 39 formed in the brackets 37 and side channels 28 of the trolley. It will be seen, therefore, that the reciprocal motion produced by the piston and cylinder unit 78 will be applied to the pivoted, depending arm 81.

Figs. 3, 4 and 6 disclose the cross-bar 80 as registering vertically with the gripping shoe 53 of the adjacent grapple arm 50 and as engaging the bumper member 54 of that shoe. As a result of this arrangement, the pressure fluid operated piston and cylinder unit 78 may be employed for moving the trolley and a seized flask longitudinally of the bridge structure in opposite directions. This action will be explained in connection with the disclosures of Figs. 3 and 4.

Starting with the full line positions of the retracted grapple arms 50 in Fig. 3, it will be assumed that these arms are moved into their broken line positions for seizing a mold flask F or F' resting on its bottom board 56 on a tray or car of the conveyor. As has been explained above, the grapple arms 50 are caused to move into their flask seizing positions by the piston and cylinder unit 59. After the grapple arms have seized a mold flask and slightly elevated the latter, the application of pressure fluid to the outer end of the piston and cylinder unit 78 will cause the piston rod 79 to move outwardly, swinging the arm 81 until its cross-bar 80 engages the bumper 54 on the adjacent grapple arm 50.

As the piston of the unit 78 continues to move through its cylinder, the force of the piston rod 79 will be applied to the grapple mechanism and its seized mold flask in the region of the lower portion of the flask. This application of force to the flask will cause the grapple mechanism carrying trolley to move longitudinally outwardly along the brige structure. The mold flask, therefore, will be moved into the position illustrated in Fig. 4 by the action of the piston and cylinder unit 78. A rail 56a is illustrated in Figs. 3 and 4 as functioning to prevent the bottom board 56 from being dragged from its conveyor car or tray by the flask.

After the sand and casting have been dislodged from the laterally displaced flask, as illustrated in Fig. 4, the application of pressure fluid to the piston and cylinder unit 78 will be changed so that the fluid will be delivered to the inner end of this unit and the outer end will be exhausted. This reversed application of pressure fluid to the piston and cylinder unit 78 will cause the piston rod to be retracted. The initial movement of this piston rod will cause the depending, pivoted arm 81 to swing until its lower end engages the bumper members 83 carried by the corner members 27 of the trolley, see Figs. 3, 4 and 6. Further retracting movement of the piston 79 will cause the trolley to move along the bridge structure from the position illustrated in Fig. 4 to the position illustrated in Fig. 3. In this latter position, the bumper 41 carried by the trolley will engage the abutment 84 formed on the depending frame portion 75 of the bridge structure, see Figs. 3 and 4.

While the grapple mechanism has possession of a mold flask and has the latter removed from its bottom board 56, which remains on the car or tray of the mold conveyor, it is very desirable to establish a connection between the bridge structure and the conveyor so that the conveyor tray or car, from which the mold flask has been removed, and the bridge structure will not be moved out of alinement.

To accomplish this desired result, Figs. 3, 4, 7 and 8 disclose the lower end portion of the trolley frame 75 as supporting a latch bar or bolt 85 for horizontal reciprocating movement. This latch bolt 85 is constantly urged toward the path of the mold conveyor by the spring 86 enclosed in the tubular housing 87. An adjusting screw 88 is threaded in the outer cap of the housing 87 and actuates an abutment 89 bearing against the inner end of the spring 86 for adjusting the force of this spring. The latch bolt is provided with a perpendicular lug 90 that is engageable with a cross-bar 91 carried by the lower extremity of the pivoted arm 81.

In Figs. 3 and 7, the pivoted arm 81 is illustrated as occupying the position it assumes when the double-acting piston and cylinder unit 78 has operated to fully retract its piston rod 79. As the pivoted arm 81 is moved into this position it functions to return the latch bar 85 to its retracted position.

When the grapple arms 50 have been moved to seize a mold flask F, and the depending arm 81 has been pivoted by the cylinder and piston unit 78 to engage the adjacent grapple arm 50, the spring loaded latch bolt 85 is permitted to move outwardly until its outer extremity engages in the recess 92 that is provided in each mold conveyor tray or car. This recess 92 of a conveyor tray is illustrated in Figs. 3, 4 and 7. Fig. 4 discloses the latch bolt 85 positioned to occupy a conveyor tray recess 92. Fig. 7 illustrates the conveyor tray recess as being of substantially greater width than the width of the cooperation extremity of the latch bolt 85. This clearance, or difference in widths, is provided to take care of a permissible amount of misalinement between the conveyor tray or car and the bridge structure.

The flasks F, with their sand molds and castings, are delivered to the automatic shakeout machine by any suitable form of conveyor which may be intermittently or continuously advanced. A suitable form of conveyor for delivering the mold flasks to the automatic shakeout machine, and for carrying away the empty flasks is illustrated in Figs. 1 to 5, inclusive.

The conveyor consists of an endless series of cars or trays 93, each one of which is supported on a pair of axles 94 having wheels 95 adapted to travel on the parallel rails 96. The cars or trays are each attached to a link 97 of an endless drive chain that preferably is continuously driven, by mechanism not shown, at a rate which preferably should not exceed 16 feet per minute. The adjacent ends of the chain links 97 are connected for articulation by the joint pins 98 which are vertically arranged. Guide rolls 99 are journaled on the joint pins 98 and are adapted to engage the parallel guide rails 100 located between the supporting rails 96.

Guard or shield plates 101 are carried by the chain links and are attached thereto by the bolts 102 with sufficient clearance 103 provided at one or both of these bolts to permit the links to properly articulate at their joints. These guards or shields 101 are provided to protect the chain joints from mold sand, or the like.

Each conveyor car or tray 93 is provided with a laterally projecting lug 104 that is employed, in a manner to be explained in detail at a later point, to actuate the several valves employed for controlling the sequence and periods of operation of the several cylinder and piston units that form the automatic shakeout machine pressure fluid system.

Because the conveyor is intended to deliver the mold flasks F to the automatic shakeout machine at a continuous rate; and because the automatic shakeout machine is intended to seize the mold flasks as they are delivered to the shakeout zone, carry the mold flasks to the lateral shakeout location where the sand and castings are dislodged, and return the empty flasks to the same conveyor cars or trays from which they were removed, means must be provided for effecting travel of the bridge structure longitudinally in opposite directions on the rails 5 and 6 of the overhead trackway.

Figs. 1, 2 and 5 disclose a double-acting piston and cylinder unit 105 which is suitably fastended to the channels 12 and 13 that form a part of the overhead trackway. The piston rod 106 of the unit 105 is suitably connected at its outer end 107 to a flange 108 attached to the outer side of the rail 16 of the bridge structure.

It will be appreciated that when pressure fluid is admitted to the outer end of the cylinder and piston unit 105, the bridge structure will be caused to move along the rails 5 and 6 of the overhead trackway in the direction of travel of the conveyor, which is indicated by the arrow line 109 of Fig. 1. Of course, the inner end of the cylinder and piston unit 105 must be exhausted as the pressure fluid is admitted to the outer end thereof. When pressure fluid is admitted to the inner end of the piston and cylinder unit 105, and pressure fluid is exhausted from the outer end of this unit, the bridge structure will be caused to travel longitudinally of the rails 5 and 6 in the opposite direction to the direction of travel of the conveyor.

The pressure fluid control system for the various double-acting cylinder and piston units 59, 72, 78 and 105, and for the vibrator units 60, is best illustrated in Figs. 1, 2, 27 and 28 and will be described in detail in connection therewith.

Compressed air, from a suitable source of supply not shown, is delivered to the pressure fluid system of the automatic shakeout machine by the supply line 110. The compressed air passes through a suitable pressure regulator 111 which operates to deliver the pressure fluid to the pipe line 112 preferably at a pressure of from 75 to 80 pounds per square inch. A solenoid valve 113 is located in the line 112. This solenoid valve is connected by the wires 114 to the control box 115 of the motor 116 that drives the mold conveyor. The motor control box 115 receives its current from other the supply lines 117.

In other words, when the motor control 115 is conditioned to supply current to the conveyor motor 116, the solenoid valve 113 will be energized, and thereby opened, to permit the pressure fluid to flow to the manifold 118. When the motor control 115 is conditioned to deenergize, or stop, the conveyor motor 116, the solenoid valve 113 will be deenergized, and thereby closed, to stop the flow of the pressure fluid to the manifold 118.

The conveyor motor control 115, normally, will be manually operated to start and stop the conveyor, by energizing and deenergizing the motor 116, and to start and stop the automatic shakeout machine, by energizing and deenergizing the solenoid valve 113. If, for any reason, the bridge structure is caused to overtravel in the direction of movement of the mold conveyor, the switch 119, see Figs. 1, 2, 4, 5 and 28, will be actuated by the laterally projecting finger 120, carried by the bridge structure, to bring about operation of the motor control 115, through the medium of the wires 119a, to stop the conveyor motor 116 and to stop the delivery of pressure fluid, through the solenoid valve 113, to the manifold 118.

The manifold 118 is illustrated in Figs. 1, 2, 27 and 28 as having branch lines 121, 122, 123, 124 and 125 extending therefrom for connection with the inlet ports of the valves 126, 127, 128, 129 and 130 respectively. A pressure gauge 131 is connected to the line 121 to indicate the pressure of the fluid applied to the several valves.

The valve 126 is of the 4-way type and includes two outlet ports that are alternately connected to the delivery lines 132 and 133 extending to the opposite ends of the double-acting cylinder and piston unit 78. This valve 126 has an exhaust port 134 that is alternately connected to the delivery lines 132 and 133. That is to say, the solid arrow lines applied to this valve 126 in Fig. 28 illustrate one condition of flow through the valve in which the pressure fluid is supplied to the delivery line 133 while the pressure fluid is exhausting from the delivery line 132. The broken arrow lines illustrate the condition of flow through the valve 126 in which the pressure fluid is delivered to the line 132 while it is being exhausted from the line 133.

Valve 127 is of the 3-way type with the exhaust port of the same blocked or closed. The outlet port of this valve is connected by the supply line 135 to the inlets 163 of the two vibrator units 60. The broken arrow line applied to this valve in Fig. 28 indicates its condition when the pressure fluid is being delivered to the supply pipe 135. The solid arrow line indicates the closed condition of the valve, or when the supply of pressure fluid to the vibrator units 60 is shut off.

The 4-way valve 128 is connected by the supply lines 136 and 137 to the opposite ends of the knockout cylinders 72. The solid arrow lines applied to this valve in Fig. 28 indicate the condition of the valve when the pressure fluid is supplied the pipe line 136 for delivery to one end of each one of the piston and cylinder units 72. The broken arrow lines indicate the condition of the valve 128 when pressure fluid is being delivered to the supply line 137 for application to the remaining ends of the two knockout cylinders 72. It will be appreciated that when either one of the supply lines 136 or 137 is receiving pressure fluid from the branch line 123, the other supply line is connected to the exhaust port 138 of this valve.

The two outlet ports of the 4-way valve 129 are connected to the supply lines 139 and 140 leading to the opposite ends of the grapple arm actuating cylinder and piston unit 59. This valve 129 is provided with an exhaust port 141. The solid arrow lines applied to this valve 129 in Fig. 28 indicate the condition of the valve when the pressure fluid is being delivered to the supply line 139 and is being exhausted from the supply line 140. The broken arrow lines indicate the condition of the valve when the pressure fluid is being supplied to line 140 and is being exhausted from line 139.

The 4-way valve 130 is provided with an exhaust port 142 and two outlet ports which are connected respectively to the supply line 143 and to the supply line 144. A speed control valve of any desired construction is indicated at 145 as being connected in the supply line 144. The solid arrow lines applied to this valve 130 in Fig. 28 indicate the condition of the valve when the pressure fluid is being delivered to the supply line 143 for application to one end of the bridge actuating cylinder 105 while exhausting the supply line 144. The broken arrow lines applied to this valve indicate the condition of the latter when pressure fluid is being supplied to the line 144 and is being exhausted from line 143.

The construction of the 4-way valves 126, 128, 129 and 130 is disclosed in detail in Figs. 29 to 31 inclusive. Because each one of these 4-way valves is of identical construction, a detailed description of valve 126 will suffice for all.

This valve includes a main casing portion 146 that is closed at its outer end and is provided with a cover plate 147 at its inner end. This cover plate is formed with a pressure fluid inlet port 148 connected to the manifold branch line 121. A duct 149 delivers the pressure fluid from the pipe line 121 to the distribution chamber 150 that is formed in the closed end portion of the main casing 146. The interior of the main casing portion 146 is hollow and in open communication with a duct 151 that leads to the exhaust pipe 134 connected to the port 152 formed in the cover plate 147.

The distribution chamber 150 is in open communication with two ducts 153 and 154 for supplying pressure fluid to the two reciprocal valve sleeves 155 and 156, respectively. The construction of both of these sleeves 155 and 156 is the same and a detailed description of sleeve 156 and its associated parts will suffice for both.

The valve sleeve 156 is illustrated as having an enlarged bore 157 for establishing communication between the radial ports 158 of the duct 154 and ports 159 of the duct 160 when the valve sleeve is in the position illustrated in Fig. 29. This duct 160 communicates with the supply line 133 connected to the port 161 formed in cover plate 147. It will be appreciated, therefore, that when either of the valve sleeves 155 or 156 is arranged in the position of valve sleeve 156 in Fig. 29, pressure fluid will be delivered from the distribution chamber 150 through the duct 154 and the ports 158 into the bore 157 of the valve sleeve and from this bore through the ports 159 into the duct 160 leading to the associated supply line 133 or 132 of the trolley piston and cylinder unit 78.

Fig. 29 illustrates the valve sleeve 155 oppositely positioned to that shown for the valve sleeve 156. When in this position, the valve sleeve leaves the ports 159 uncovered or exposed so that the pressure fluid may be exhausted from the associated supply line 132 or 133 into the interior of the casing portion 146 and from this interior through the duct 151 to the exhaust line 134.

The reciprocal valve sleeves 155 and 156 are connected by the operating rods 162 and 163, respectively, to the rockable head 164 of the actuating lever 165 pivotally supported on the valve casing part 146 by the pin 166. From the condition of valve 126 illustrated in Figs. 29 and 30, it will be seen that the control lever 165 is positioned to supply pressure fluid to the line 133 and to exhaust pressure fluid from the line 132. When the control lever 165 is shifted to its opposite operating position, pressure fluid is exhausted from the supply line 133 and is delivered to the supply line 132.

Figs. 32 and 33 illustrate the detail construction of the 3-way valve 127. This valve includes a main casing portion 167 that is closed at its outer end and is provided with a cover plate 168 at its inner end.

Pressure fluid is supplied to this valve by the branch line 122 and the fluid flows through the duct 169 to the distribution chamber 170 formed in the closed end of the casing portion 167. A duct 171 is in constant communication with the distribution chamber 170 and delivers pressure fluid to the ports 172 that lead to the enlarged bore 173 of the reciprocal valve sleeve 174. A second duct 175, having ports 176, is placed in communication with the enlarged bore 173 of the reciprocal valve sleeve 174 when this sleeve is moved to the right of Fig. 32.

When the valve sleeve 174 is in this last mentioned position, the pressure fluid will be delivered to the supply line 135 that leads to inlets 63 of the two vibrator units 60. Because both of these vibrator units 60 have their own exhaust ports or openings 65, the exhaust duct 177 of this valve 127 is closed by the plug 178. The valve sleeve 174 is reciprocated by the rod 179 connected to the head 180 of the control lever 181 pivoted to the valve casing portion 167 by the pin 182.

Figs. 1 and 2 disclose a box-like housing 183 located alongside of the path of the mold conveyor and opposite a conveyor car or tray 93 that is on the approach side of the shakeout zone. That is to say, the housing 183 is positioned two car-lengths away from the conveyor car or tray carrying the mold flask that is being handled by the automatic shakeout machine.

Figs. 15, 16 and 23 disclose this box-like housing 183 as being employed for enclosing the several pressure fluid valves 126 to 130, inclusive. The valve enclosing housing 183 includes a base portion formed by two parallel, side channel members 184 and 185 and two parallel, end angle members 186 and 187. Suitable legs 188 are provided for supporting the base elevated sufficiently to allow for the passage of the various pressure fluid lines therebeneath.

Three spaced, upstanding frames 189, 190 and 191 are attached to the base. Frame 189 functions to support the valve 126 while frame 190 supports the valves 127 and 128, and frame 191 supports the valves 129 and 130.

A cover 192 encloses the entire framework and base of the valve housing and is arranged to have its top wall rest on the tops of the upstanding frames 189, 190 and 191. Lugs 193 are attached to the upper portions of the frames 189 and 191 and pass through openings formed in the top wall of the cover 192 for cooperating with the lugs 194, fastened to the top wall of the cover 192, for receiving seals, or the like, 195 which will prevent tampering with the control valves.

Four parallel control shafts 196, 197, 198 and 199 are rotatably supported at their opposite end portions by the bearings 200 mounted on the channel members 184 and 185. The cover 192 is provided with an opening 192a in one side wall to permit one end of each of the shafts 196 to 199 to project outwardly of the housing 183.

As was pointed out above in connection with the detail disclosures of the 4-way valves, see Fig. 29, each one of these valves 126, 128, 129 and 130 is provided with an operating lever 165. The 3-way valve 127 was described as having an operating lever 181.

Figs. 16 and 17 disclose the mechanism employed for utilizing the transverse shafts 196 to 199 inclusive for operating the several valve control levers 165 and 181.

The control shaft 196 has keyed thereto a yoke 201 that functions to actuate the control lever 165 of the valve 126 when shaft 196 is rocked. Adjusting screws 202 are provided to vary the connection between this valve operating lever 165 and its yoke 201.

The transverse operating shaft 197 is not provided with any valve operating yoke.

Transverse shaft 198 is provided with yokes 203 and 204 for operating, respectively, the lever 181 of valve 127 and the lever 165 of valve 128. Both of these yokes 203 and 204 are provided with adjusting screws 202 the same as yoke 201.

The operating shaft 199 has mounted thereon the yokes 205 and 206 for operating, respectively, the valves 129 and 130. These yokes, also, are provided with the same type of adjusting screws 202.

Figs. 15, 17 and 18 disclose the outer extremity of the valve operating shaft 196 as having loosely mounted thereon an upstanding lever 207 having an adjustable link 208 pivotally connected to the same intermediate its ends and extending to for connection with the lower end of the lever 209 that is keyed on the valve operating shaft 199.

Figs. 15, 19 and 20 disclose a lever 210 as being keyed to the transverse shaft 196, adjacent the lever 207. The intermediate portion of this lever 210 is connected by an adjustable link 211 to the lower end portion of a lever 212 loosely mounted on the transverse shaft 198.

Figs. 15, 21 and 22 disclose a lever 213 as being loosely mounted at its lower end on the transverse shaft 197. The intermediate portion of this lever 213 is connected by an adjustable link 214 to the lower end of lever 215 keyed on the transverse operating shaft 198.

Figs. 1, 15 and 17 to 23, inclusive, disclose the manner in which the lugs 104, that are carried by all of the mold conveyor cars or trays, function to bring about the proper sequence of operation of the several pressure fluid valves 126 to 130, inclusive, by engaging the upper extremities of the several levers 207, 209, 210, 212, 213 and 215 in proper timed relation. It is to be understood that the lug 104 that is carried by the conveyor tray or car located two positions in advance of the shakeout zone is the one that functions to actuate the various valve levers. The manner in which the various valves are operated in sequence can best be explained in connection with Figs. 15 and 17 to 22, inclusive.

The approaching lug 104 will first engage the upper extremities of parallel levers 207 and 210 to move these levers from the full line positions of Figs. 17 and 19 to the broken line positions of these two figures. This actuation of lever 207 will not effect rotation of the valve operating shaft 196 because of the loose connection between these two elements. However, the link 208 connected to lever 207 will function to move lever 209 from its full line position to its broken line position. Because lever 209 is keyed to valve operating shaft 199, this shaft will be rocked and the operating levers 165 of valves 129 and 130 will be rocked from the positions illustrated in Figs. 15 and 16 to their other operating positions.

The 4-way valve 129 will thus be changed from the flow condition represented by the solid arrow lines of Fig. 28 to the condition represented by the broken arrow lines of this figure. This change in the condition of valve 129 will cause fluid to be delivered to the lower end of the grapple piston and cylinder unit 59 for effecting pivotal movement of the grapple arms 50 to cause them to seize and slightly elevate the mold flask F that has been delivered to the shakeout zone.

The actuation of pressure fluid valve 130 has changed the condition of the same from that of the solid arrow lines of Fig. 28 to that of the broken arrow lines of this figure. Consequently, pressure fluid will be delivered through valve 130 to the supply line 144 that leads to the outer end of the bridge actuating cylinder and piston unit 105 with the result that the bridge structure will start moving longitudinally of the rails 5 and 6 in the direction of travel of the conveyor. The speed control valve 145 in supply line 144 is adjusted so that this rate of travel of the bridge structure will synchronize with the rate of travel of the conveyor.

The simultaneous engagement of the conveyor car lug 104 with lever 210 causes this lever to move from its full line position of Fig. 19 to the broken line position of this figure. Due to the connection of lever 210 with lever 212 through the link 211, lever 212 will be moved from its full line position of Fig. 19 to its broken line position of this figure. Because lever 212 is loose on the valve operating shaft 198, this shaft will not be actuated.

Pivotal movement of lever 210 will cause the transverse valve operating shaft 196 to be rocked for actuating the pressure fluid valve 126. This actuation of valve 126 will change its condition from that of the full arrow lines of Fig. 28 to that of the broken arrow lines. Consequently, pressure fluid will flow through the supply line 132 to the outer end of the cylinder and piston unit 78. Actuation of this unit will bring about movement of the depending, pivoted arm 81 with the result that the trolley will be moved longitudinally of the bridge structure and the spring loaded latch bolt 85 will be permitted to move into the recess 92 of the conveyor car or tray 93 that has presented the mold flask to the grapple arms 50.

After the conveyor car lug 104 has actuated levers 207 and 210, it moves into position to actuate lever 213 and move the same from the full line position of Fig. 21 to the dotted line position. As transverse shaft 197 is not operatively connected to any of the valves, lever 213 is loosely mounted on this shaft. The pivotal movement of lever 213, through the medium of link 214, causes lever 215 to move from its full line position of Fig. 21 to its broken line position. This lever 215 is keyed to transverse shaft 198 and rotation of this shaft will effect actuation of the valves 127 and 128.

The valve 127 will be actuated to condition it for flow of presure fluid from the branch line 122 to the supply line 135 so that the two vibrator units 60 will be supplied with fluid. This condition of flow of fluid through valve 127 is represented by the broken arrow line of Fig. 28.

Actuation of valve 128 will condition the same for the flow of pressure fluid from the branch line 123 to the supply lines 137 and for exhausting of the pressure fluid from the opposite ends of the knockout cylinders 72 through the supply line 136 and valve 128 to the exhaust port 138. This condition of valve 128 is represented by the broken arrow lines of Fig. 28.

After the conveyor car or tray carried lug 104 has passed beyond lever 213, it will engage the upper ends of levers 212 and 215 which, it will be remembered, have been moved into their broke line positions as indicated in Figs. 19 and 21.

Actuation of lever 212 by lug 104 will move the lever into its full line position with the result that lever 210 will be moved from its broken line position into its full line position, see Fig. 19. This return movement of lever 210 will bring about rotation of the transverse shaft 196 and the operation of valve 126. This valve, therefore, will be conditioned so that pressure fluid will flow in accordance with the solid arrow lines, or so that the fluid will be delivered to the supply line 133 and will be exhausted from supply line 132. Reversal of the flow of pressure fluid will bring about operation of the cylinder and piston unit 78 to return the trolley to its starting position, or with its empty flask in vertical alinement with the path of the mold conveyor.

Movement of lever 215 from its broken line position of Fig. 21 to its full line position will cause the transverse shaft 198 to be rotated and lever 213 to be returned to its full line position. Rotation of shaft 198 will bring about actuation of valves 127 and 128.

Valve 127 will be changed to the solid arrow line condition illustrated in Fig. 28, or with the supply of presure fluid shut-off from the two vibrator units 60. Actuation of valve 128 will return it to the condition represented by the solid arrow lines of Fig. 28. That is to say, pressure fluid will be delivered to the supply line 136 and will be exhausted from the supply line 137. This application of pressure fluid to the cylinder and piston units 72 will cause the knockout bars or rods 74 to be retracted.

After the conveyor car or tray carried lug 104 has passed beyond levers 212 and 215, it will next engage lever 209 and move this lever from the broken line position of Fig. 17 to its full line position. This movement of lever 209 will bring about actuation of the transverse shaft 199 and will move lever 207 back into its full line position. Actuation of the transverse shaft 199 will bring about operation of valves 129 and 130.

Valve 129 will be conditioned by its actuation to bring about flow of fluid in accordance with the directions indicated by the solid arrow lines of Fig. 28. That is to say, fluid will flow through the supply line 139 and will be exhausted from the supply line 140. This application of pressure fluid to the cylinder and piston unit 59 will cause the grapple arms 50 to be pivoted to release the empty flask and deposit it on the conveyor car or tray 93 from which it had been removed.

Actuation of valve 130, by this last-mentioned rotation of the transverse shaft 199, will condition this valve for pressure fluid flow in the direction indicated by the solid arrow lines in Fig. 28. That is to say, the pressure fluid will be delivered to the supply line 143 and will be exhausted from the supply line 144. Due to the absence of a speed control valve in supply line 143, the flow of fluid therethrough will actuate the piston of the cylinder unit 105 for quickly returning the bridge structure to its starting position.

Coming now to Fig. 34, a careful study of its disclosure will reveal that it clearly indicates two different cycles of movement of the bridge structure in synchronism with the mold conveyor that is traveling at a speed of 16 feet per minute for cycle "I" and 17 feet per minute for cycle "II". This chart, also, clearly indicates the timing of the operations of the grapple cylinder and piston unit 59, the two knockout cylinder and piston units 72 and the two vibrator units 60 with reference to the travel of the bridge structure and the trolley.

The second printed line of this chart indicates that the bridge structure travels a total of 27 inches for cycle I and 28.56 inches for cycle II in the direction of movement of the mold conveyor while the bridge is latched to the car or tray of the conveyor from which the mold flask is removed for shaking out its sand and casting.

The third line of the chart indicates the cycle I in which the 27 inch travel of the bridge is broken down into three increments of 7.1 inches, 12.8 inches and 7.1 inches. The first breakdown of 7.1 inches indicates the travel of the bridge while the trolley is moving outwardly along the bridge structure to carry the seized mold flask to the shakeout location. The second breakdown of 12.8 inches indicates the distance traveled by the bridge while the mold flask is being held at the lateral shakeout location for dislodging the sand and casting. The third increment of 7.1 inches indicates the distance traveled by the bridge structure while the trolley is being returned to position the empty flask over the conveyor car or tray from which it was removed.

The fourth line of the chart indicates the breakdown of the 28.56 inches of synchronized travel of the bridge structure for cycle II. This breakdown is in increments of 7.48 inches, 13.6 and 7.48 inches.

The legends appearing at the tops of the two right hand columns of this chart read "Bridge return" and "Dwell period." The first legend indicates the return travel of the bridge structure to its starting position while the second legend indicates the period when the bridge structure is held stationary prior to the start of a new cycle.

The remaining 7 horizontal lines of this chart indicate the periods of operation of the various valves 126 to 130, inclusive. It is interesting to note that valve 129, which controls the grapple cylinder and piston unit 59, should be operated slightly in advance of the operation of valves 130 and 126 which control the cylinder and piston units 105 and 78, respectively, for the bridge structure and the trolley. It is believed that the remainder of this chart is self-explanatory.

The upper portion of the time cycle chart of Fig. 35 indicates the trapezoidal shape of the path of travel of the flask handling grapple arms. This path is reproduced in broken arrow lines on Fig. 1. It will be noted, however, that the directions of travel indicated on the path of Fig. 35 are reversed to those indicated on Fig. 1 so that the path of Fig. 35 will better correspond with the disclosure of the chart of Fig. 34.

It will be noted that 2.2 seconds are required for the grapple arms to move from point A to point B of the path; 4 seconds for the grapple arms to move from point B to point C of the path, and 2.2 seconds for the grapple arms to move from point C to point D. After arriving at point D, the grapple arms are returned to point A of the path in 3 seconds for cycle I and in 3.17 seconds for cycle II. After the grapple mechanism has been returned to point A of the path, the mechanism remains idle at this point for 2.8 seconds in cycle I and for 2.71 seconds in cycle II before starting on a new shakeout cycle. Below the trapezoidal path of Fig. 35, the first line indicates that 15.8 seconds are required to complete time cycle I while 15.88 seconds are required to complete time cycle II. The lower portion of Fig. 35 sets forth a further breakdown in seconds of the operations for time cycles I and II.

Figs. 36 to 42, inclusive, disclose a modification of the automatic shakeout machine illustrated in Figs. 1 to 35, inclusive. In this modification, all of the basic elements are the same with the exception of the control valves for the pressure fluid system and the manner in which these valves are actuated to produce the desired, automatic shakeout cycle. For that reason, the same reference characters will be applied to like parts in Figs. 36 to 42, inclusive, while new reference characters will be applied to the several valves and the means employed for actuating these valves.

Referring first to Figs. 36 to 38, inclusive, it will be seen that each one of the conveyor cars or trays 93 is provided with a longitudinally extending cam 216 that is positioned laterally of the inner side thereof. These cams 216 are employed for actuating the 4-way valve 217 positioned alongside of the conveyor track, as is best illustrated in Figs. 37 and 38. This valve 217 is so located that the roller 218, carried by the two plunger rods 219, will be depressed by the front end of the cam 216 carried by a conveyor car or tray 93 as it arrives at the shakeout zone of the machine. That is to say, the valve 217 will be actuated as soon as a conveyor car or tray 93 arrives at the position in which its mold flask F is lined up with the grapple mechanism of the movable trolley.

The cam 216 of this properly located conveyor tray or car 93 maintains the plunger rods 219 of the switch 217 depressed until the conveyor car or tray has advanced a substantial distance along the supporting tracks. After the conveyor car or tray moves with its cam 216 beyond the location of the valve 217, the springs 220, encircling the valve plunger rods 219, will return these rods to their initial, projected positions.

Valve 217 is illustrated in Figs. 39 and 42 as being operatively connected with the double-acting piston and cylinder unit 78 which functions to move the depending pivoted arm 81. It will be recalled that this arm 81 performs the functions of causing the trolley to travel longitudinally of the bridge structure and of releasing the latch bolt 85 so that it will move, under the force of the spring 86, to lock the bridge structure to the conveyor car or tray from which a mold flask is removed for dislodging its sand and casting.

Figs. 38 and 39 disclose the pivoted arm 81 as carrying a plate 221 which functions to actuate the two 4-way valves 222 and 223. Figs. 36 and 38, inclusive, disclose these two valves as being mounted on a bracket 224 carried by the depending frame 75 of the bridge structure.

Figs. 39 and 42 illustrate the valve 222 as being connected to the double-acting cylinder and piston unit 59 that operates the grapple arms 50. These two figures, also, disclose the valve 223 as being connected to the cylinder and piston unit 105 which functions to move the bridge structure along the overhead rails 5 and 6 of the trackway.

It will be seen, therefore, that when the arm 81 is pivoted by the cylinder and piston unit 78 to effect movement of the trolley longitudinally of the bridge structure, the initial free movement of arm 81 will result in operation of the grapple mechanism to seize a mold flask. This initial movement of the pivoted arm 81 also will condition valve 223 to exhaust the inner end of the cylinder and piston unit 105. In this modified machine, the cylinder and piston unit 105 only operates to return the bridge structure to its starting position and for that reason it functions as a single-acting, cylinder and piston unit. The latching of the bridge structure to the car of the mold conveyor will bring about synchronized movement of the bridge structure with the conveyor.

Figs. 36 to 38, inclusive, disclose the trolley as having an angle bracket 224 mounted on its outer side to project upwardly therefrom. This bracket has attached thereto a 4-way valve 225 and a 2-way valve 226.

Figs. 39 and 42 illustrate the 4-way valve 225 as being connected to control the operations of the two knockout cylinder and piston units 72. These same figures, also, illustrate the valve 226 as being connected to control the operation of the two vibrator units 60.

By considering Figs. 36 and 38, it will be seen that the two valves 225 and 226 will be actuated by the upstanding bracket arm 227, carried by the outer side of the frame of the bridge structure, when the trolley is moved outwardly a sufficient distance to locate the seized mold flask in position for dislodging its sand and casting. Consequently, when the trolley has moved along the bridge structure to its outermost position, valves 225 and 226 will be actuated to bring about operation of the two vibrator units 60 and operation of the knockout cylinder and piston units 72 to cause the knockout bars or rods 74 to be projected into the mold flask being handled by the grapple mechanism.

The timing of the operation of this modified machine is such that the vibrator units 60 continue to operate and the knockout bars or rods 74 are held in their projected positions until the conveyor car or tray at the shakeout zone has advanced far enough to move its cam 216 out of engagement with the roller of valve 217. When valve 217 is disengaged, the pressure fluid connections to the double-acting cylinder and piston unit 78 are reversed so that pressure fluid is applied to the inner end of this unit and is exhausted from its outer end. Consequently, the piston and cylinder unit 78 will operate to pivot the depending arm 81 to its normal or starting position. After the lower end of the pivoted arm 81 has been moved into engagement with the bumper 83, carried by the corner members 27 of the trolley structure, continued actuation of the cylinder and piston unit 78 will cause the trolley to be moved along the bridge structure into its starting position, as illustrated in Fig. 38.

As soon as the trolley has moved along the bridge sufficiently to disengage the plungers of the valves 225 and 226 from their operating bracket arm 227, these two valves will be conditioned to stop the operations of the two vibrator units 60 and to reverse the application of pressure fluid to the knockout piston and cylinder units 72 so that the knockout bars or rods 74 will be retracted to their normal positions.

The trolley will continue to move longitudinally of the bridge structure until the plate 221, carried by the pivoted arm 81, engages and depresses the plungers of valves 222 and 223. Actuation of valve 222 will bring about operation of the double-acting cylinder and piston unit 59 to cause the grapple arms 50 to pivot so as to deposit the empty flask on the conveyor car or tray 93 from which it was removed. Actuation of the valve 223 will bring about the application of pressure fluid to the inner end of the cylinder and piston unit 105 so that this unit will function to quickly return the bridge structure to its starting position.

By inspecting Fig. 38, it will be seen that the final movement of the trolley into its starting position will bring about retraction of the latch bolt 85 to release the bridge structure from the conveyor sufficiently in advance of actuation of the valve 223 to permit the cylinder and piston unit 105 to return the bridge structure to the starting position when the pressure fluid is applied to the inner end of this unit.

All of the 4-way valves 217, 222, 223 and 225 are of identical construction and a description of the valve shown in Fig. 40 will suffice for all. This valve includes a main body or casing 228 that includes an inlet port 229, an exhaust port 230, and two outlet ports 231 and 232. As has been previously described, the valve includes two reciprocating plunger members 219 which are normally projected into their outermost positions by the springs 220. The outer ends of these plungers 219 are interconnected by the pin 233 on which the roller 218 is freely mounted.

When the plungers 219 occupy their outermost positions, pressure fluid will flow through the valve from the inlet port 229 to the outlet port 232 while pressure fluid will flow from the outlet port 231 to the exhaust port 230. When the plungers 219 occupy their innermost positions, pressure fluid will flow through the valve from the inlet port 229 to the outlet port 231 and pressure fluid will flow from the outlet port 232 to the exhaust port 230.

The 2-way valve 226 includes a main body or housing 234 that includes an inlet port 235 and an outlet port 236. This valve has a plunger 237 normally urged into its outermost position by the spring 238. The outer extremity of this plunger 237 is provided with a roller 239 mounted for free rotation on the pin 240. When the plunger 237 is in its outermost position, no flow path is formed through the valve between the inlet port 235 and the outlet port 236. However, when the plunger 237 occupies its innermost position, a flow path for fluid is established between the inlet port 235 and the outlet port 236.

By referring to Figs. 39 and 42, it will be seen that the pressure fluid, such as compressed air at a pressure of from 75 to 80 pounds per square inch, is delivered by the pipe line 241 to the manifold 242. A branch line 243 leads from this manifold to the inlet port 229 of the valve 217. Supply line 244 leads from the outlet 232 of valve 217 to the inner end of the double-acting cylinder and piston unit 78. The supply line 245 leads from the outlet port 231 of valve 217 to the outer end of the cylinder and piston unit 78. A pressure gauge 246 is connected in the branch line 242 and functions to indicate the pressure of the fluid in the manifold 242 and in each one of the branch lines leading therefrom to the several valves.

These same figures disclose a branch line 247 that leads from manifold 242 to the inlet of the 2-way valve 226. The outlet port 236 of this valve is connected by a supply line 248 to the inlet chambers 63 of the two vibrator units 60.

A third branch line 249 leads from the manifold 242 to the inlet port 229 of valve 225. The outlet port 231 of this valve is connected by a supply line 250 to the upper ends of the two knockout cylinder and piston units 72. The outlet port 232 of this valve 225 has connected thereto the supply line 251 that leads to the lower ends of the two cylinder and piston units 72.

A fourth branch line 253 extends from the manifold 242 to the inlet port 229 of valve 222. The outlet port 231 of this valve 222 has connected thereto the supply line 254 that leads to the upper end of the grapple cylinder and piston unit 59. The second outlet port 232 of valve 222 has connected thereto a supply line 255 that leads to the lower end of the grapple cylinder and piston unit 59.

The fifth and final branch line 256 leads from the manifold 242 to the inlet port 229 of valve 223. The outlet port 231 of this valve is connected by the supply line 257 to the inner end of the single-acting cylinder and piston unit 105. The outer end of this unit is provided with an open vent 258. The outlet port 232 of the valve 223 is closed because it is not needed.

From the above description of the modified form of automatic shakeout machine shown in Figs. 36 to 42 inclusive, it will be seen the sequence of operation of the various valves and their controlled pressure fluid cylinder and piston units is dependent on the movements of the trolley along the rails of the bridge structure, the movement of pivoted arm 81 relative to the trolley frame and the movement of conveyor cars or trays into and out of the shakeout zone. Also, the initiation of this sequence of operation is dependent on the movement of a conveyor car or tray into the shakeout zone of the machine.

It will be appreciated that the travel and time cycle charts shown in Figs. 34 and 35 will apply to the machine of Figs. 36 to 42, inclusive, in the same way they apply to the first described machine. It will not be necessary, therefore, to repeat the description of these charts for the improvement machine. It will be noted, however, that the reference characters applied to the several valves of the modified machine will have to be substituted for the valve reference characters that are applied to the chart of Fig. 34.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, we claim:

1. An automatic shakeout machine for flask type molds, comprising the combination with a continuously traveling conveyor for delivering mold flasks successively to a shakeout zone, of a stationary overhead trackway straddling the conveyor at the shakeout zone and including rails paralleling and arranged on opposite sides of said conveyor, a bridge supported on said rails for travel in opposite directions above and longitudinally of said conveyor, means for moving the bridge, a trolley supported on the bridge for travel therealong, means carried by the bridge for moving the trolley along the bridge in opposite directions between two positions located one above and a second laterally of the conveyor, grapple mechanism for handling mold flasks delivered to the shakeout zone by the conveyor, means for suspending the grapple mechanism from the trolley and for actuating said mechanism to cause it to seize and release delivered mold flasks, mechanism for dislodging the sand and casting from a seized mold flask while the trolley with said flask is located laterally of the conveyor, means for latching the bridge to the conveyor while the grapple mechanism is handling a mold flask that has been removed from the conveyor, separate controls for the grapple mechanism actuating means, the bridge moving means, and the trolley moving means, and means actuating said separate controls in the proper sequence to effect a shakeout operation.

2. An automatic shakeout machine for flask type molds, comprising the combination with a continuously traveling conveyor for delivering mold flasks successively to a shakeout zone, of a stationary overhead trackway straddling the conveyor at the shakeout zone and including rails paralleling and arranged on opposite sides of said conveyor, a bridge supported on said rails for travel in opposite directions above and longitudinally of said conveyor, said bridge having a depending frame formed at one end thereof, means for moving the bridge, a trolley supported on the bridge for travel therealong, said trolley having a depending frame arranged at one side thereof and paralleling the depending frame of the bridge, means connected to said depending frames for moving the trolley along the bridge in opposite directions between two positions located one above and a second laterally of the conveyor, grapple mechanism for handling mold flasks delivered to the shakeout zone by the conveyor, means for suspending the grapple mechanism from the trolley and for actuating said mechanism to cause it to seize and release delivered mold flasks, mechanism for dislodging the sand and casting from a seized mold flask while the trolley with said flask is located laterally of the conveyor, means carried by the depending frame of the bridge for latching the bridge to the conveyor while the grapple mechanism is handling a mold flask that has been removed from the conveyor, separate controls for the grapple mechanism actuating means, the bridge moving means, and the trolley moving means, and means actuating said separate controls in the proper sequence to effect a shakeout operation.

3. An automatic shakeout machine for flask type molds, comprising the combination with a continuously traveling conveyor for delivering mold flasks successively to a shakeout zone, of a stationary overhead trackway overlying the conveyor at the shakeout zone, a bridge supported on said trackway for travel in opposite directions above and longitudinally of said conveyor, a pressure fluid operated piston and cylinder unit supported by the overhead trackway for moving the bridge, a trolley supported on the bridge for travel therealong, a pressure fluid operated piston and cylinder unit supported by the bridge for moving the trolley along the bridge in opposite directions between two positions located one above and a second laterally of the conveyor, grapple mechanism for handling mold flasks delivered to the shakeout zone by the conveyor, means for suspending the grapple mechanism from the trolley and including a pressure fluid actuated piston and cylinder unit for operating said mechanism to cause it to seize and release delivered mold flasks, mechanism for dislodging the sand and casting from a seized mold flask while the trolley with said flask is located laterally of the conveyor, means for latching the bridge to the conveyor while the grapple mechanism is handling a mold flask that has been removed from the conveyor, a piping system for individually connecting all of the aforesaid pressure fluid actuated units to a source of supply of said fluid, a valve for each individual connection of the piping system, and means for actuating said valves in the proper sequence to effect a shakeout operation and to initiate said sequence in proper timed relation to the delivery of a mold flask to the shakeout zone.

4. An automatic shakeout machine for flask type molds, comprising a stationary overhead trackway straddling the path of a conveyor that successively delivers mold flasks to a shakeout zone and including rails paralleling and arranged on opposite sides of said conveyor path, a bridge supported on said rails for travel in opposite directions above and longitudinally of said conveyor path, means for moving the bridge, a trolley supported on the bridge for travel therealong, means carried by the bridge for moving the trolley along the bridge in opposite directions between two positions located one above and a second laterally of the conveyor path, grapple mechanism for handling mold flasks delivered to the shakeout zone, means for suspending the grapple mechanism from the trolley and for actuating said mechanism to cause it to seize and release delivered flasks, mechanism for dislodging the sand and casting from a seized mold flask while the trolley with said flask is located laterally of the conveyor path, a latch bar carried by the bridge and movable toward and away from the conveyor path for connecting the bridge to the conveyor while the grapple mechanism is handling a mold flask that has been removed from the conveyor, separate controls for the grapple mechanism actuating means, the bridge moving means, and the trolley moving means, and means actuating said separate controls in the proper sequence to effect a shakeout operation.

5. An automatic shakeout machine for flask type molds, comprising a stationary overhead trackway straddling the path of a conveyor that successively delivers mold flasks to a shakeout zone and including rails paralleling and arranged on opposite sides of said conveyor path, a bridge supported on said rails for travel in opposite directions above and longitudinally of said conveyor path, means supported by the overhead trackway for moving the bridge, a trolley supported on the bridge for travel therealong, means carried by the bridge for moving the trolley along the bridge in opposite directions between two positions located one above and a second laterally of the conveyor path, grapple mechanism for handling mold flasks delivered to the shakeout zone and including a pair of pivoted arms, means for suspending the grapple mechanism from the trolley and including a prime mover for actuating said pivoted arms to cause them to successively seize, elevate, lower and release delivered flasks, means attached to the grapple mechanism for dislodging the sand and casting from a seized mold flask while the trolley with said flask is located laterally of the conveyor path, separate controls for the grapple mechanism actuating prime mover, the bridge moving means, and the trolley moving means, and means located to one side of the conveyor path to be engaged and operated by the conveyor for actuating said separate controls in the proper sequence to effect a shakeout operation.

6. An automatic shakeout machine for flask type molds, comprising a stationary overhead trackway overlying the path of a conveyor that successively delivers mold flasks to a shakeout zone, a bridge supported on said trackway for travel in opposite directions above and longitudinally of said conveyor path, a pressure fluid operated piston and cylinder unit supported by the overhead trackway for moving the bridge, a trolley supported on the bridge for travel therealong, a pressure fluid operated piston and cylinder unit supported by the bridge for moving the trolley along the bridge in opposite directions between two positions located one above and a second laterally of the conveyor path, grapple mechanism for handling mold flasks delivered to the shakeout zone, means for suspending the grapple mechanism from the trolley and including a pressure fluid actuated piston and cylinder unit for operating said mechanism to cause it to seize and release delivered mold flasks, mechanism for dislodging the sand and casting from a seized mold flask while the trolley with said flask is located laterally of the conveyor path, a latch bar carried by the bridge and movable toward and away from the conveyor path for connecting the bridge to the conveyor while the grapple mechanism is handling a mold flask that has been removed from the conveyor, a piping system for individually connecting all of the aforesaid pressure fluid actuated units to a source of supply of said fluid, a valve for each individual connection of the piping system, and means for actuating said valves in the proper sequence to effect a shakeout operation and to initiate said sequence in proper timed relation to the delivery of a mold flask to the shakeout zone.

7. An automatic shakeout machine for flask type molds, comprising a stationary overhead trackway straddling the path of a conveyor that successively delivers mold flasks to a shakeout zone and including rails paralleling and arranged on opposite sides of said conveyor path, a bridge supported on said rails for travel in opposite directions above and longitudinally of said conveyor path, a pressure fluid operated piston and cylinder unit supported by the overhead trackway for moving the bridge, a trolley supported on the bridge for travel therealong, a pressure fluid operated piston and cylinder unit supported by the bridge for moving the trolley along the bridge in opposite directions between two positions located one above and a second laterally of the conveyor path, grapple mechanism for handling mold flasks delivered to the shakeout zone, means for suspending the grapple mechanism from the trolley and including a pressure fluid actuated piston and cylinder unit for operating said mechanism to cause it to seize and release delivered mold flasks, a pressure fluid actuated cylinder and piston unit attached to the grapple mechanism for dislodging the sand and casting from a seized mold flask while the trolley with said flask is located laterally of the conveyor path, a latch bar carried by the bridge and movable toward and away from the conveyor path for connecting the bridge to the conveyor while the grapple mechanism is handling a mold flask that has been removed from the conveyor, a pressure fluid actuated piston and cylinder unit for controlling the position of said latch bar, a piping system for individually connecting all of the aforesaid pressure fluid actuated units to a source of supply of said fluid, a valve for each individual connection of the piping system, and means for actuating said valves in the proper sequence to effect a shakeout operation and to initiate said sequence in proper timed relation to the delivery of a mold flask to the shakeout zone.

8. An automatic shakeout machine for flask type molds, comprising a stationary overhead trackway straddling the path of a conveyor that successively delivers mold flasks to a shakeout zone and including rails paralleling and arranged on opposite sides of said conveyor path, a bridge supported on said rails for travel in opposite directions above and longitudinally of said conveyor path, said bridge having a depending frame arranged at one end thereof, means for moving the bridge, a trolley supported on the bridge for travel therealong, said trolley having a depending frame arranged at one side thereof and paralleling the depending frame of the bridge, means connected to said depending frames for moving the trolley along the bridge in opposite directions between two positions located one above and a second laterally of the conveyor path, grapple mechanism for handling mold flasks delivered to the shakeout zone, means for suspending the grapple mechanism from the trolley and for actuating said mechanism to cause it to seize and release delivered mold flasks, mechanism for dislodging the sand and castings from a seized mold flask while the trolley with said flask is located laterally of the conveyor, a latch bar carried by the depending frame of the bridge and movable toward and away from the conveyor path for connecting the bridge to the conveyor while the grapple mechanism is handling a mold flask that has been removed from the conveyor, separate controls for the grapple mechanism actuating means, the bridge moving means, and the trolley moving means, and means actuating said separate controls in the proper sequence to effect a shakeout operation.

9. An automatic shakeout machine for flask type molds, comprising a stationary overhead trackway straddling the path of a conveyor that successively delivers mold flasks to a shakeout zone and including rails paralleling and arranged on opposite sides of said conveyor path, a bridge supported on said rails for travel in opposite directions above and longitudinally of said conveyor path, said bridge having a depending frame arranged at one end thereof, a pressure fluid operated prime mover supported by the overhead trackway for moving the bridge, a trolley supported on the bridge for travel therealong, said trolley having a depending frame arranged at one side thereof and paralleling the depending frame of the bridge, a pressure fluid operated prime mover connected to said depending frames for moving the trolley along the bridge in opposite directions between two positions located one above and a second laterally of the conveyor path, grapple mechanism for handling mold flasks delivered to the shakeout zone, means for suspending the grapple mechanism from the trolley and including a pressure fluid operated prime mover for actuating said mechanism to cause it to successively seize, elevate, lower and release delivered mold flasks, mechanism for dislodging the sand and castings from a seized mold flask while the trolley with said flask is located laterally of the conveyor, a piping system for individually connecting all of the aforesaid prime movers to a source of supply of said fluid, a valve for each individual connection of the piping system, and means for actuating said valves in the proper sequence to effect a shakeout operation and to initiate said sequence in proper timed relation to the delivery of a mold flask to the shakeout zone.

10. An automatic shakeout machine for flask type molds for use with a continuously traveling conveyor delivering the molds to a shakeout zone, comprising a trackway paralleling the conveyor, a bridge mounted on said trackway for movement in forward and reverse directions, means for moving said bridge, a trolley mounted on said bridge for movement in both directions transversely of said bridge, grapple arms supported on said trolley and being adapted to seize and release a mold flask, power means for actuating said arms to seize and raise a mold flask off the conveyor, means for latching said bridge to the conveyor substantially at the time said arms seize a mold flask, power means for moving said trolley to a location over a shakeout zone laterally of the conveyor, means for vibrating said arms to dislodge the sand and casting from the flask, power means for returning said trolley to its initial position relative to said bridge, said grapple arm power means, upon the return of said trolley to its original position, being adapted to actuate said arms to release the empty flask at its original position on the conveyor, and means for unlatching said bridge from the conveyor upon releasing said empty flask.

WALTON L. WOODY.
BEAUFORD E. GAVIN, Sr.

REFERENCES CITED

The following references are of record in the file of this patent:

UNITED STATES PATENTS

| Number | Name | Date |
|---|---|---|
| 600,620 | Reese | May 15, 1898 |
| 938,904 | Sherman | Nov. 2, 1909 |
| 1,159,707 | Peterson | Nov. 9, 1915 |
| 1,515,488 | Johnson et al. | Nov. 11, 1924 |
| 1,556,645 | Stoney et al. | Oct. 13, 1925 |
| 1,570,658 | Wickland et al. | Jan. 26, 1926 |
| 1,695,127 | Stoney et al. | Dec. 11, 1928 |
| 1,724,332 | Will et al. | Aug. 13, 1929 |
| 1,734,174 | McCabe | Nov. 5, 1929 |
| 1,736,366 | Ramsden | Nov. 19, 1929 |
| 1,942,919 | Eurich et al. | Jan. 9, 1934 |
| 1,973,005 | Lemmon | Sept. 11, 1934 |
| 2,007,275 | Kendall | July 9, 1935 |
| 2,028,225 | Larson | Jan. 21, 1936 |
| 2,068,835 | Wurster | Jan. 26, 1937 |
| 2,398,177 | Elliott | Apr. 9, 1946 |

FOREIGN PATENTS

| Number | Country | Date |
|---|---|---|
| 114,346 | Sweden | June 26, 1945 |